(12) United States Patent
Hanasaki et al.

(10) Patent No.: US 11,582,981 B2
(45) Date of Patent: Feb. 21, 2023

(54) OIL-IN-WATER TYPE EMULSION COMPOSITION, AND METHOD FOR PRODUCING SAID OIL-IN-WATER TYPE EMULSION COMPOSITION

(71) Applicant: MITSUBISHI CHEMICAL CORPORATION, Chiyoda-ku (JP)

(72) Inventors: Minako Hanasaki, Chiyoda-ku (JP); Tsutashi Matsuura, Chiyoda-ku (JP); Tetsuo Kasai, Chiyoda-ku (JP); Tatsushi Isojima, Chiyoda-ku (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 198 days.

(21) Appl. No.: 16/434,474

(22) Filed: Jun. 7, 2019

(65) Prior Publication Data

US 2019/0281852 A1  Sep. 19, 2019

Related U.S. Application Data

(63) Continuation of application No. PCT/JP2017/044255, filed on Dec. 8, 2017.

(30) Foreign Application Priority Data

Dec. 8, 2016 (JP) .............................. JP2016-238828
Mar. 1, 2017 (JP) ................................. 2017-038788

(51) Int. Cl.
    *A23D 7/005* (2006.01)
    *A23D 7/04* (2006.01)
    *B01J 13/00* (2006.01)

(52) U.S. Cl.
    CPC .............. *A23D 7/005* (2013.01); *A23D 7/04* (2013.01); *B01J 13/00* (2013.01); *A23V 2002/00* (2013.01);

(Continued)

(58) Field of Classification Search
    None
    See application file for complete search history.

(56) References Cited

U.S. PATENT DOCUMENTS

2007/0261293 A1  11/2007  Tajima et al.
2010/0135938 A1   6/2010  Ishikubo et al.
(Continued)

FOREIGN PATENT DOCUMENTS

JP      2004-2275 A    1/2004
JP      2006-239666 A  9/2006
(Continued)

OTHER PUBLICATIONS

Duffus et al., "A comparative study on the capacity of a range of food-grade particles to form stable O/W and W/O Pickering emulsions". from Journal of Colloid and Interface Science 473 (2016) 9-21) (Year: 2016).*

(Continued)

*Primary Examiner* — Erik Kashnikow
*Assistant Examiner* — Assaf Zilbering
(74) *Attorney, Agent, or Firm* — Oblon, McClelland, Maier & Neustadt, L.L.P.

(57) ABSTRACT

The object of the present invention is to provide an emulsion composition that maintains emulsion stability even after high temperature process such as sterilization (heat resistance), shows a small change in particle size distribution between before and after heating, and maintains emulsion stability even under conditions where transformation of an oil phase component (for example, solidification or crystallization of the oil phase component due to temperature drop, or melting of the oil phase component due to temperature rise) occurs (temperature drop resistance), wherein the composition is easily handled during the production process. The object is solved by an oil-in-water emulsion composition (Continued)

containing solid particles, a predefined surfactant, an oil phase component, and an aqueous phase component, wherein the oil phase component includes a predefined oil component and the solid particles are distributed along the interface between the oil phase component and the aqueous phase component.

26 Claims, 10 Drawing Sheets

(52) U.S. Cl.
CPC ... *A23V 2200/222* (2013.01); *A23V 2200/254* (2013.01); *A23V 2250/1878* (2013.01); *A23V 2300/31* (2013.01)

(56) References Cited

U.S. PATENT DOCUMENTS

| | | | |
|---|---|---|---|
| 2010/0297039 | A1 | 11/2010 | Ishikubo et al. |
| 2012/0128747 | A1 | 5/2012 | Véronique et al. |
| 2015/0125498 | A1 | 5/2015 | Dejmek et al. |
| 2015/0351430 | A1 | 12/2015 | Pipe et al. |
| 2016/0175432 | A1 | 6/2016 | Ma et al. |
| 2017/0196779 | A1 | 7/2017 | Nam et al. |

FOREIGN PATENT DOCUMENTS

| | | | |
|---|---|---|---|
| JP | 2008-291027 | A | 12/2008 |
| JP | 2013-500844 | A | 1/2013 |
| JP | 2014-3974 | A | 1/2014 |
| JP | 2014-505673 | A | 3/2014 |
| JP | 2014-113123 | A | 6/2014 |
| JP | 2016-501548 | A | 1/2016 |
| WO | WO 01/85324 | A1 | 11/2001 |
| WO | WO 2014/118489 | A1 | 8/2014 |
| WO | WO 2015/170099 | A1 | 11/2015 |
| WO | WO 2015/183042 | A1 | 12/2015 |
| WO | WO 2015/192603 | A1 | 12/2015 |

OTHER PUBLICATIONS

Pawlik et al., "Food-grade Pickering emulsions stabilized with solid lipid particles". Food & Function 2016, 7, 2712 (Year: 2016).*
Indian Office Action dated May 19, 2021 in Indian Patent Application No. 201917026932, 6 pages.
Office Action dated Feb. 18, 2021 in corresponding Indonesian Patent Application No. P00201905678 (with English Translation), 6 pages.
Extended European Search Report dated Nov. 13, 2019, in Patent Application No. 17878032.6, 10 pages.
Dickinson, E., "Use of nanoparticles and microparticles in the formation and stabilization of food emulsions", Trends in Food Science and Technology, XP055084194, vol. 24, No. 1, Mar. 1, 2012, pp. 4-12.
Wang, J. et al., "Pickering Emulsions Stabilized by a Lipophilic Surfactant and Hydrophilic Platelike Particles", Langmuir, XP055076222, vol. 26, No. 8, Apr. 20, 2010, pp. 5397-5404.
International Search Report dated Feb. 13, 2018 in PCT/JP2017/044255, 4 pages.
International Preliminary Report on Patentability and Written Opinion dated Jun. 20, 2019 in PCT/JP2017/044255 (submitting English translation only), 12 pages.
Hu, Z., et al., "Surfactant-enhanced cellulose nanocrystal Pickering emulsions", Journal of Colloid and Interface Science, vol. 439, 2015, pp. 139-148.
Feng, Y., et al., "Surface modification of zein colloidal particles with sodium caseinate to stabilize oil-in-water pickering emulsion". Food Hydrocolloids, vol. 56, May 2016, pp. 292-302.
Ho, K.W., et al., "Comparison of self-aggregated chitosan particles prepared with and without ultrasonication pretreatment as Pickering emulsifier", Food Hydrocolloids, vol. 52. Jan. 2016, pp. 827-837.
Giermanska-Kahn, J., et al., "Particle-Stabilized Emulsions Comprised of Solid Droplets", Langmuir, vol. 21 No. 10, 2005, pp. 4316-4323.
Arima, T., "Effects of sucrose fatty acid esters on oil and fat crystallization and stability in o/w emulsions", Oil and Fat, vol. 65 No. 4, 2012, pp. 94-102 (with partial English translation).
Ota. S., et al., "Hydrolysis of Edible Fats and Oils", Journal of Japan Oil Chemist's Society, vol. 26 No. 3, 1977, pp. 150-164 (with partial English translation).
Office Action dated Dec. 1, 2020 in the Philippine Patent Application No. 1/2019/501284, 4 pages.
Notice of Reasons for Refusal dated Jul. 13, 2021 in Japanese Patent Application No. 2017-236515 (with English machine translation), 7 pages.
Combined Chinese Office Action and Search Report dated Dec. 3, 2021 in corresponding Chinese Patent Application No. 201780075832.1 (with English Translation), 35 pages.
Indonesian Office Action dated Oct. 26, 2021 in Indonesian Patent Application No. P00201905678 (with unedited computer generated English translation), 4 pages.
Japanese Office Action dated Nov. 2, 2021 in Japanese Patent Application No. 2018-036745 (with English translation), 9 pages.
Office Action dated Mar. 3, 2022 in the corresponding Philippines Patent Application No. 1/2019/501284, 4 pages.
Japanese Office Action dated Feb. 1, 2022 in Japanese Patent Application No. 2017-236515 (with unedited computer generated English translation), 10 pages.
Examination Report No. 1 dated Nov. 29, 2021 in Australian Patent Application No. 2017372671, 3 pages.
Third-Party Observation dated Nov. 12, 2021 in corresponding Japanese Patent Application No. 2017-236515 (with English Translation), pages.
Akio Kato, "Application of Palm Oil/Palm Kernel Oil", Saiwai Shobo, 1990, pp. 104-107 with its partial English translation.
Takao Ido et al., "Properties of Arabic Gum and its Applications", Journal of Applied Glycoscience, 1(3), 2011, pp. 244-246 with its partial English translation.
Office Action issued in corresponding Indonesian Patent Application No. P00201905678 dated Sep. 25, 2022 (with machine English-language translation).
Office Action issued in corresponding Australian Patent Application No. 2017372671 dated Oct. 7, 2022.
Hearing Notice issued in corresponding Indian Patent Application No. 201917026932, dated Oct. 26, 2022 (w/English translation).
Office Action issued in corresponding Korean Patent Application No. 10-2019-7019513 dated Nov. 23, 2022 (w/English language translation).
Office Action dated Sep. 5, 2022, in corresponding Chinese Patent Application No. 201780075832.1 (w/ Machine English language translation).
Patent examination report issued in the corresponding New Zealand Patent Application No. 755070 dated Dec. 20, 2022.

* cited by examiner

OIL-IN-WATER TYPE EMULSION COMPOSITION, AND METHOD FOR PRODUCING SAID OIL-IN-WATER TYPE EMULSION COMPOSITION

CROSS-REFERENCE TO RELATED APPLICATION

This is a continuation of International Application No. PCT/JP2017/044255, filed on Dec. 8, 2017, and designated the U.S., and claims priority from Japanese Patent Application No. 2016-238828 which was filed on Dec. 8, 2016 and Japanese Patent Application No. 2017-038788 which was filed on Mar. 1, 2017, the entire contents of which are incorporated herein by reference.

TECHNICAL FIELD

The present invention relates to an oil-in-water emulsion composition and a method for producing the oil-in-water emulsion composition.

BACKGROUND ART

Emulsification techniques using an emulsifier or surfactant are conventionally used for emulsification processes in the food field. Since emulsions formed by emulsification with an emulsifier or surfactant are thermodynamically unstable, an oil-in-water (O/W) emulsion composition has been required to reduce the size of oil droplets to submicron levels to ensure stability against sterilization processes at high temperature or long-term storage stability.

However, there is recently diverse needs in the food field, such as appetizing appearance, flavor (a quality that stimulates the senses of taste and smell), food texture, and health concerns over food ingredients. Thus, there is a demand for an emulsification technique that enables preparation of emulsion compositions each having an emulsion size and a structure different from those of conventional emulsion compositions which are prepared using an emulsifier or surfactant. Recently, the particle-stabilized emulsion (Pickering emulsion) engineering and the three-phase emulsification technique are intensively studied as technique for emulsification by means other than an emulsifier or surfactant.

In particular, a method described in Patent Document 1 is disclosed in the cosmetics field. Additionally, a method described in Patent Document 2 is disclosed in the pharmaceutical field.

However, emulsion compositions should be imparted with heat resistant properties to resist high temperature heating during sterilization process when those emulsion compositions are used, for example, in food applications. On the one hand, the control of particle size, which affects, for example, food texture, appearance, tactile impression, viscosity, and stability, is an important aspect for edible substances used in food products, pharmaceutical products, and the like. Nevertheless, whether or not the particle size distribution of an emulsion measured after heating is changed from that measured before heating is mentioned neither in Patent Document 1 nor in Non-Patent Document 1. Additionally, compared with oily components, such as paraffin, used in industrial applications, ester oily components and edible oils and fats have a higher polarity, which causes, together with problems with the composition distribution and the purity, difficulties in selection of particles with appropriate wettability and in stabilization of emulsion compositions by means of a particle-based stabilization technique. Additionally, use of oily components other than edible oils and fats is harmful to human bodies or otherwise makes it difficult to prepare sufficiently tasty oil-in-water emulsion compositions. In addition, emulsion compositions described in Patent Document 2 are easily broken down by thermal stimulation and contain an excess amount of a surfactant and are consequently inadequate for use in food applications.

On the other hand, methods described in Patent Documents 3, 4, and 6 are disclosed as the particle-stabilized emulsion engineering in the food and cosmetics fields. A method described in Patent Document 5 is disclosed as the three-phase emulsification technique.

However, emulsion compositions should be imparted with heat resistant properties to resist high temperature heating during sterilization process when those emulsion compositions are used, for example, in food applications. Additionally, the control of particle size, which affects, for example, food texture, appearance, tactile impression, viscosity, and stability, is an important aspect for edible substances used in food products, pharmaceutical products, and the like. Nevertheless, whether or not the particle size distribution of an emulsion measured after heating is changed from that measured before heating is mentioned neither in Patent Document 3 nor in Patent Document 4.

It can be easily envisaged that according to the method described in Patent Document 4, the taste and flavor of a food will be affected by the taste and flavor of coffee beans, and also by the deep and dark color of coffee beans particularly when the coffee beans to be used are roasted, which limits the application of the method. An attempt to provide a desired taste, color, and flavor to a food product results in addition of many seasoning ingredients, coloring agents, and flavors, and it is thus predictable that the number of production steps and the total amount of additives are increased, which in turn results in a laborious and expensive production process. Additionally, use of roasted coffee beans has been accompanied with concerns about ingestion of acrylamide, a harmful chemical substance that forms during roasting process. In addition, the method described in Patent Document 5 has required a step of preparing single particles of a biopolymer for use in stabilization of oil droplets.

Furthermore, compared with oily components, such as paraffin, used in industrial applications, ester oily components and edible oils and fats have a higher polarity, which causes, together with problems with the composition distribution and the purity, difficulties in selection of particles with appropriate wettability and in stabilization of emulsion compositions by means of a particle-based stabilization technique. Additionally, use of oily components other than edible oils and fats is harmful to human bodies or otherwise makes it difficult to prepare sufficiently tasty oil-in-water emulsion compositions.

In addition, the number of patients with food allergy who exhibit allergic symptoms to certain foods is increasing mainly in younger generations. Food allergies can cause symptoms such as skin itching and inflammation, as well as severe, life-threatening conditions such as anaphylaxis shock, and are thus highly dangerous. Therefore, there is a demand for food materials that contain as little allergenic materials as possible. In particular, exclusion of milk-derived proteins, particularly casein and β-lactoglobulin whey protein, which are highly allergenic, from food raw materials has been needed to avoid milk allergy symptoms.

PRIOR ART DOCUMENTS

Patent Documents

Patent Document 1: Japanese Unexamined Patent Application Publication No. 2008-291027
Patent Document 2: Japanese Translation of PCT International Application Publication No. 2013-500844
Patent Document 3: Japanese Translation of PCT International Application Publication No. 2014-505673
Patent Document 4: Japanese Translation of PCT International Application Publication No. 2016-501548
Patent Document 5: Japanese Unexamined Patent Application Publication No. 2006-239666
Patent Document 6: Japanese Unexamined Patent Application Publication No. 2004-002275

Non-Patent Documents

Non-Patent Document 1: J. Giermanska-Kahn, et. al., Langmuir 2005, 21, 4316-4323.
Non-Patent Document 2: Oil and Fat (2012), Vol. 65, No. 4, 94-102.
Non-Patent Document 3: Journal of Japan Oil Chemist's Society (1977), 26, 150.

SUMMARY OF THE INVENTION

Problems to be Solved by the Invention

In the production of oil-in-water emulsion compositions, the production cost and the easy handling for workers are greatly affected also by the degree of bubble formation during high speed agitation, in terms of the use of an antifoaming agent during the production process and the length of production time. Thus, it is also an important aspect to suppress the bubble formation to a minimum during the production process.

Additionally, inhibition of coalescence of oil droplets, inhibition of creaming of oil droplets which may lead to coalescence of oil droplets, and emulsion instability resulting from destruction of interface due to growing needle-like crystals are big issues in oil-in-water emulsions prepared using an oil phase component having an unsaturated bond(s) and/or an oxygen atom(s), such as an oil-in-water emulsion prepared using an edible oil or fat (Non-Patent Document 2).

In addition, it is a problem of edible oils and fats to generate the odor of oxidized or hydrolyzed oils and fats (Non-Patent Document 3).

The first object of the present invention is to provide an emulsion composition that maintains emulsion stability even after high temperature process such as sterilization (heat resistance), shows a small change in particle size distribution between before and after heating, and maintains emulsion stability even under conditions where transformation of an oil phase component (for example, solidification or crystallization of the oil phase component due to temperature drop, or melting of the oil phase component due to temperature rise) occurs (temperature drop resistance), wherein the composition is easily handled during the production process. Additionally, the second object of the present invention is to provide a food-grade composition that maintains emulsion stability even after high temperature process such as sterilization (heat resistance), shows a small change in particle size distribution between before and after heating, and maintains emulsion stability even under conditions where transformation of an oil phase component (for example, solidification or crystallization of the oil phase component due to temperature drop, or melting of the oil phase component due to temperature rise) occurs (temperature drop resistance), wherein degradation of the contained oil or fat is inhibited in the composition. Additionally, the third object of the present invention is to provide an emulsion composition that maintains emulsion stability even after high temperature process such as sterilization (heat resistance) and shows a small change in particle size distribution between before and after heating. Additionally, the fourth object of the present invention is to provide an emulsion composition that shows no change in the substructure of itself due to gelatinization, maintains emulsion stability even after high temperature process such as sterilization (heat resistance), and shows a small change in particle size distribution between before and after heating. Additionally, the fifth object of the present invention is to provide an composition that maintains emulsion stability even under conditions where transformation of an oil phase component (for example, solidification, crystallization, or change in surface tension of the oil phase component due to temperature drop, or melting or change in surface tension of the oil phase component due to temperature rise) occurs (temperature drop resistance). A further object of the present invention is to provide a composition that is not harmful to human bodies upon ingestion, has an excellent taste, and particularly gives a stronger oily impression (sensory impression of oil or fat) than the same amount of other oils and fats, which can contribute to reducing the oil and fat content in foods and beverages.

Means for Solving the Problem

The inventors intensively studied to solve the above-described problems, and found that the above-described first and second objects can be achieved by emulsion compositions containing solid particles and having an emulsion structure where the solid particles are distributed along the interface between the oil phase component and the aqueous phase component by means of a combination of a surfactant and a particular oily component, and that the above-described third to fifth objects can be achieved by an emulsion composition containing solid particles which form particular contact angles with an aqueous phase component and an oil phase component, and thereby completed the present invention.

That is, the first aspect of the present invention is summarized below.

(A1) An oil-in-water emulsion composition comprising solid particles, a surfactant containing one alkyl group, an oil phase component, and an aqueous phase component, wherein the oil phase component comprises an edible oil or fat having an unsaturated bond(s) and/or an oxygen atom(s), and the solid particles are distributed along an interface between the oil phase component and the aqueous phase component.

(A2) The oil-in-water emulsion composition according to (A1), which is resistant to heat at a temperature of 60° C. or higher.

(A3) The oil-in-water emulsion composition according to (A1) or (A2), wherein the concentration of the surfactant is not less than 0.00001% by weight and not more than 0.05% by weight relative to the total weight of the composition.

(A4) The oil-in-water emulsion composition according to any of (A1) to (A3), wherein the surfactant comprises a surfactant having an HLB value of greater than 8.

(A5) The oil-in-water emulsion composition according to any of (A1) to (A4), wherein the concentration of the surfactant in the composition is not higher than a critical micelle concentration of the surfactant.

(A6) The oil-in-water emulsion composition according to any of (A1) to (A5), wherein the surfactant comprises a surfactant that contains at least one cationic group in the molecule.

(A7) The oil-in-water emulsion composition according to any of (A1) to (A6), wherein the surfactant comprises a cationic surfactant.

(A8) The oil-in-water emulsion composition according to any of (A1) to (A7), wherein an average particle size of the solid particles is not less than 0.01 μm and not more than 5 μm.

(A9) The oil-in-water emulsion composition according to any of (A1) to (A8), wherein an average particle size of the solid particles distributed along an interface between a continuous phase and a discontinuous phase is not less than 0.01 μm and not more than 5 μm.

(A10) The oil-in-water emulsion composition according to any of (A1) to (A9), wherein the size of discontinuous phase droplets in the oil-in-water emulsion composition is 0.5 μm or more and less than 1 mm.

(A11) The oil-in-water emulsion composition according to any one of (A1) to (A10), which is for use in foods.

(A12) A method of producing the oil-in-water emulsion composition according to any of (A1) to (A11), which comprises the step A1 of mixing the aqueous phase component with the surfactant and the solid particles and agitating the resulting mixture, and the step A2 of mixing the mixture obtained in the prior step with the oil phase component and agitating the resulting mixture.

(A13) A method of producing the oil-in-water emulsion composition according to any of (A1) to (A11) (A12), which comprises the step A1' of mixing the oil phase component with the surfactant and the solid particles and agitating the resulting mixture, and the step A2' of mixing the mixture obtained in the prior step with the aqueous phase component and agitating the resulting mixture.

The second aspect of the present invention is summarized below.

(B1) A food-grade oil-in-water emulsion composition comprising solid particles, a surfactant, an oil phase component, and an aqueous phase component, wherein the oil phase component comprises an edible oil or fat; and the solid particles are distributed along an interface between the oil phase component and the aqueous phase component.

(B2) The food-grade oil-in-water emulsion composition according to (B1), which is resistant to heat at a temperature of 60° C. or higher.

(B3) The food-grade oil-in-water emulsion composition according to (B1) or (B2), wherein the concentration of the surfactant is not less than 0.00001% by weight and not more than 0.05% by weight relative to the total weight of the composition.

(B4) The food-grade oil-in-water emulsion composition according to any of (B1) to (B3), wherein the surfactant comprises a surfactant having an HLB value of greater than 8.

(B5) The food-grade oil-in-water emulsion composition according to any of (B1) to (B4), wherein the concentration of the surfactant in the composition is not higher than a critical micelle concentration of the surfactant.

(B6) The food-grade oil-in-water emulsion composition according to any of (B1) to (B5), wherein the surfactant comprises a surfactant that contains at least one cationic group in the molecule.

(B7) The food-grade oil-in-water emulsion composition according to any of (B1) to (B6), wherein the surfactant comprises a cationic surfactant.

(B8) The food-grade oil-in-water emulsion composition according to any of (B1) to (B7), wherein the average particle size of the solid particles is not less than 0.01 μm and not more than 5 μm.

(B9) The food-grade oil-in-water emulsion composition according to any of (B1) to (B8), wherein the average particle size of the solid particles distributed along an interface between a continuous phase and a discontinuous phase is not less than 0.01 μm and not more than 5 μm.

(B10) The food-grade oil-in-water emulsion composition according to any of (B1) to (B9), wherein the size of discontinuous phase droplets in the oil-in-water emulsion composition is 0.5 μm or more and less than 1 mm.

(B11) A method of producing the food-grade oil-in-water emulsion composition according to any of (B1) to (B10), which comprises the step A1 of mixing the aqueous phase component with the surfactant and the solid particles and agitating the resulting mixture, and the step A2 of mixing the mixture obtained in the prior step with the oil phase component and agitating the resulting mixture.

(B12) A method of producing the food-grade oil-in-water emulsion composition according to any of (B1) to (B10), which comprises the step A1' of mixing the oil phase component with the surfactant and the solid particles and agitating the resulting mixture, and the step A2' of mixing the mixture obtained in the prior step with the aqueous phase component and agitating the resulting mixture.

The third aspect of the present invention is summarized below.

(C1) An oil-in-water emulsion composition comprising solid particles, an oil phase component, and an aqueous phase component, wherein the contact angle of the aqueous phase component to the solid particles is 90.0 degrees or less; the contact angle of the oil phase component to the solid particles is 8.0 degrees or more; an average diameter of oil phase droplets in the emulsion composition is not more than 100 μm; and the solid particles are distributed along the interface between the oil phase component and the aqueous phase component.

(C2) The oil-in-water emulsion composition according to (C1), wherein the solid particles do not contain starch as major solid particles.

(C3) The oil-in-water emulsion composition according to (C1) or (C2), wherein the solid particles have an L value of 31 or more, and the L value represents a color brightness.

(C4) The oil-in-water emulsion composition according to any of (C1) to (C3), wherein the average particle size of the solid particles is not less than 0.01 μm and not more than 10 μm.

(C5) The oil-in-water emulsion composition according to any of (C1) to (C4), wherein the average particle size of the solid particles distributed along the interface between the aqueous phase and the oil phase is not less than 0.01 μm and not more than 5 μm.

(C6) The oil-in-water emulsion composition according to any of (C1) to (C5), wherein a change in a median diameter (D50) of droplets in the oil-in-water emulsion composition after heating at 121° C. from a median diameter (D50) of droplets in the oil-in-water emulsion composition before heating is not more than 130% based on that the median diameter (D50) of droplets in the oil-in-water emulsion composition before heating is regarded as 100%.
(C7) The oil-in-water emulsion composition according to any of (C1) to (C6), wherein the oil phase of the emulsion composition contains at least one selected from a middle chain fatty acid, a pigment, and a flavor.
(C8) The oil-in-water emulsion composition according to any of (C1) to (C7), wherein the oil phase component comprises an edible oil or fat.
(C9) The oil-in-water emulsion composition according to any of (C1) to (C8), which is for oral ingestion.
(C10) The oil-in-water emulsion composition according to any of (C1) to (C9), which is for use in foods.
(C11) A method of producing the oil-in-water emulsion composition according to any of (C1) to (C10), wherein the method comprises the step B1 of dispersing the solid particles in the aqueous phase component to obtain an aqueous phase, and the step B2 of mixing the oil phase component with the aqueous phase obtained in the step B1 and agitating the resulting mixture.
(C12) A method of producing the oil-in-water emulsion composition according to any of (C1) to (C10), wherein the method comprises the step B1' of dispersing the solid particles in the oil phase component to obtain an oil phase, and the step B2' of mixing the aqueous phase component with the oil phase obtained in the step B1' and agitating the resulting mixture.
(C13) A method of producing the oil-in-water emulsion composition according to any of (C1) to (C10), wherein the method comprises the step B1" of dispersing the solid particles in the aqueous phase component and the oil phase component to obtain an aqueous phase and an oil phase, and the step B2" of mixing the aqueous phase and the oil phase obtained in the step B1" and agitating the resulting mixture.

Advantageous Effect of the Invention

The present invention can provide an emulsion composition that maintains emulsion stability even after high temperature process such as sterilization (heat resistance), shows a small change in particle size distribution between before and after heating, and maintains emulsion stability even under conditions where transformation of an oil phase component (for example, solidification or crystallization of the oil phase component due to temperature drop, or melting of the oil phase component due to temperature rise) occurs (temperature drop resistance), wherein the composition is easily handled during the production process. Additionally, the present invention can provide a food-grade composition that maintains emulsion stability even after high temperature process such as sterilization (heat resistance), shows a small change in particle size distribution between before and after heating, and maintains emulsion stability even under conditions where transformation of an oil phase component (for example, solidification or crystallization of the oil phase component due to temperature drop, or melting of the oil phase component due to temperature rise) occurs (temperature drop resistance), wherein degradation of the contained oil or fat is inhibited in the composition. Additionally, the present invention can provide an emulsion composition that has emulsion stability even after high temperature process such as sterilization (heat resistance) and shows a small change in particle size distribution between before and after heating. Additionally, the present invention can provide an emulsion composition that shows no change in the substructure of itself due to gelatinization, maintains emulsion stability even after high temperature process such as sterilization (heat resistance), and shows a small change in particle size distribution between before and after heating. Additionally, the present invention can provide a composition that maintains emulsion stability even under conditions where transformation of an oil phase component (for example, solidification, crystallization, or change in surface tension of the oil phase component due to temperature drop, or melting or change in surface tension of the oil phase component due to temperature rise) occurs (temperature drop resistance). Furthermore, the present invention can provide a composition that is not harmful to human bodies upon ingestion, has an excellent taste, and particularly gives a stronger oily impression (sensory impression of oil or fat) than the same amount of other oils and fats, which can contribute to reducing the oil and fat content in foods and beverages.

DETAILED DESCRIPTION OF THE INVENTION

Figure 1:
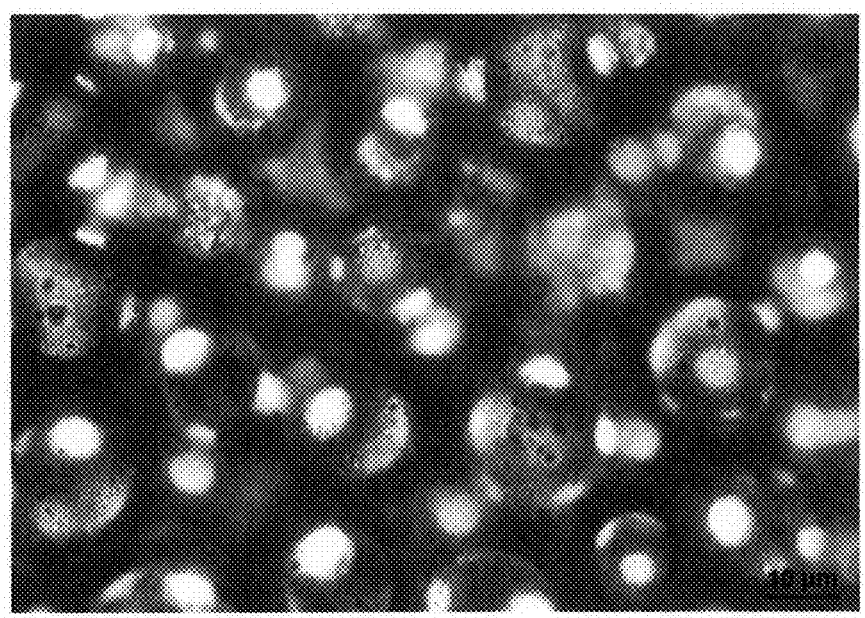
FIG. 1 shows a polarization micrograph (a picture as a substitute for a diagram) of the oil-in-water emulsion composition A after being heated to 60° C. and then cooled down to room temperature.

Now, embodiments of the present invention will be described in detail below. The embodiments whose features are described below are illustrative (representative) embodiments of the present invention and do not limit the invention provided that they come within the scope and spirit of the present invention.
Oil-in-water emulsion compositions according to the embodiments of the present invention each contain solid particles, a surfactant, an oil phase component, and an aqueous phase component, and have a structure where the solid particles are distributed along the interface between the oil phase component and the aqueous phase component.

Specifically, the first embodiment of the present invention is an oil-in-water emulsion composition comprising solid particles, a surfactant containing one alkyl group, an oil phase component, and an aqueous phase component, wherein the oil phase component comprises an edible oil or fat having an unsaturated bond(s) and/or an oxygen atom(s); and the solid particles are distributed along the interface between the oil phase component and the aqueous phase component.

Additionally, the second embodiment of the present invention is a food-grade oil-in-water emulsion composition comprising solid particles, a surfactant, an oil phase component, and an aqueous phase component, wherein the oil phase component comprises an edible oil or fat; and the solid particles are distributed along the interface between the oil phase component and the aqueous phase component.

Furthermore, the third embodiment of the present invention is an oil-in-water emulsion composition comprising solid particles, an oil phase component, and an aqueous phase component, wherein the contact angle of the aqueous phase component to the solid particles is 90.0 degrees or less;

the contact angle of the oil phase component to the solid particles is 8.0 degrees or more;

the average diameter of oil phase droplets in the emulsion composition is not more than 100 μm; and the solid particles are distributed along the interface between the oil phase component and the aqueous phase component.

In this specification, the oil-in-water emulsion compositions include multi-layer emulsions such as W/O/W emulsion, as well as oil-in-water (O/W) emulsion compositions in which the aqueous phase is the continuous phase. Additionally, the distribution of solid particles along the interface between the oil phase component and the aqueous phase component can be confirmed by cross-sectional observation of each oil-in-water emulsion composition under cryo-scanning electron microscope (Cryo-SEM) or the like. The method of cross-sectional observation is not limited to a particular method as long as it is a commonly used method, and the cross-sectional observation can be performed by, for example, rapidly freezing an oil-in-water emulsion composition by the metal contact technique or the like, then preparing cross-sections using a cryo-microtome with a diamond knife for light microscope observations, and observing the cross-sections of the sample by Cryo-SEM.

Any solid particles may be used as the solid particles contained in the oil-in-water emulsion compositions of the first and second embodiments of the present invention as long as those solid particles are not dissolved in the aqueous and oil phase components to be used and the aqueous phase and/or the oil phase can be agitated even after the solid particles are added to the aqueous phase component and/or the oil phase component. Examples of the solid particles include particles of inorganic materials, organic materials, and organic-inorganic composite materials.

Examples of the inorganic materials include silica particles, such as spherical silica and fumed silica; ceramics, such as talc, titanium oxide, and hydroxyapatite; calcium carbonate, zeolite, and inorganic pigments. Examples of the organic materials include polysaccharides, such as chitin, chitosan, cellulose, microcrystalline cellulose, hydroxypropyl methylcellulose, hydroxy cellulose, methylcellulose, fermented cellulose, sodium carboxymethylcellulose, gellan gum, native gellan gum, xanthan gum, carrageenan, dextrin, indigestible dextrin, soybean polysaccharides, pectin, alginic acid, propylene glycol alginate, tamarind seed gum, Tara gum, karaya gum, guar gum, locust bean gum, tragacanth gum, ghatti gum, pullulan, gum arabic, agar, furcellaran, inulin, and konjac mannan; polymers, such as polylactic acid, polyvinyl alcohol, and polyethylene glycol; organic pigments, oligomers, Janus particles, starch, starch products, cyclodextrin; animal proteins, such as whey and casein; plant proteins, such as soybean proteins and zein; microorganism-derived proteins, such as hydrophobins; enzymes, protein degradation products, peptides, microorganisms, spores, cells; plant extracts, such as flavonoids; ground food products, such as ground protein gel products and cereal powder; and complexes and derivatives thereof. The solid particles may be synthetic or natural. Particularly in cases of polysaccharide- and polymer-based particles, the polysaccharide and the polymer may be linear (for example, cellulose), branched (for example, glucomannan and the like), side-chain (for example, galactomannans), or spherical (for example, gum arabic, soybean polysaccharides). The polysaccharide may be an acidic, neutral, or basic polysaccharide. Examples of the organic-inorganic composite materials include Fe-containing ferritin, gel particles prepared from sodium alginate and a calcium salt, and the like. The solid particles before being dispersed in the aqueous or oil phase may be in powder form, paste form, or pellet form.

The source material of the starch is not limited to a particular raw material, and representative examples of the raw material include potato, waxy potato, wheat, corn, waxy corn, high-amylose corn, sweet potato, rice, waxy rice, cassava, kudzu, dogtooth violet, mung bean, sago palm, bracken, and *Cardiocrinum cordatum* var. *glehnii*.

Examples of the starch products include processed starch products and chemically modified starch products which are produced by applying various wet or dry (enzymatic, physical, or chemical) processes to starch to improve properties or to impart functions, specifically including enzyme-treated starch, sodium starch glycolate, sodium starch phosphate, acetylated distarch adipate, acetylated distarch phosphate, acetylated oxidized starch, hydroxypropyl distarch phosphate, phosphated distarch phosphate, monostarch phosphate, distarch phosphate, starch acetate, hydroxypropyl starch, starch sodium octenylsuccinate, oxidized starch, acid treated starch, gelatinized starch, dried starch, heat treated starch, heat-moisture treated starch, oil/fat-coated starch, granulated starch, and oil-absorbing starch.

By the term "solid," it is meant that the composition has no fluidity at temperatures in the time frame from preparation to consumption.

The shape of the solid particles is not limited, and examples of the solid particle shape include spherical shapes, rod shapes, string shapes, gel shapes, mesh shapes, porous shapes, needle shapes, flake shapes, and aggregate shapes. The solid particles may be separated particles, aggregated particles, or associated particles. In cases where each of the solid particles are composed of a single polymer, those solid particles are preferred to have an entanglement structure or a cross-linking structure through hydrogen bonding, ion bonding, or intermolecular force interaction. The solid particles may be composed of a single type of material or may be composed of a mixture, aggregate, or association of different types of materials. In cases where the solid particles are in a gel form, the solid particles may be shrunk or swelled. The solid particles may contain any active component inside or carry any active component on the surface.

In cases where silica is used, either hydrophilic or hydrophobic silica may be used, and hydrophilic silica is preferred in terms of safety and cost, with consideration given to the use of silica in the food field and the pharmaceutical field. Any known method may be used to impart hydrophilicity or hydrophobicity to silica, and examples of the method include surface treatment with a silane coupling agent. The solid particles used in the present invention are not limited, but do not necessarily need such a chemical pretreatment.

For use in the food field, the solid particles should be edible and may be food additives or food raw materials. For the solid particles, a single type of solid particles or a combination of two or more types of solid particles may be used.

The primary particle size of the solid particles is not limited to a particular size, and is typically not less than 0.001 μm, preferably not less than 0.01 μm, more preferably not less than 0.05 μm, further preferably not less than 0.1 μm, particularly preferably not less than 0.5 μm, and is typically not more than 50 μm, preferably not more than 5 μm, more preferably not more than 1 μm, particularly preferably not more than 0.9 μm. The primary particle size of the solid particles refers to the average particle size of particles that can be observed in enlarged images of particles acquired, for example, by scanning electron microscopy (SEM). The observed particles may be not less than 5, 40, 100, or 200 in number. The catalog value of the primary particle size may be used as the primary particle size of the solid particles.

The average particle size of the solid particles is not limited to a particular size, and the average particle size of the solid particles in a dilute dispersion is typically not less than 0.01 μm, preferably not less than 0.05 μm, further preferably not less than 0.1 μm, particularly preferably not less than 0.5 μm, and is typically not more than 50 μm, preferably not more than 5 μm, more preferably not more than 3 μm, further preferably not more than 1 μm, particularly preferably not more than 0.9 μm.

For the size of the solid particles in a liquid, a laser diffraction/scattering particle size analyzer can be used, for example, to measure the particle size distribution, average particle size, and median diameter of the solid particles in powder form or liquid dispersion form. In this respect, the term "dilute" refers to any concentration that can be determined by, for example, a flow method using a laser diffraction/scattering particle size distribution analyzer. The concentration to be measured is typically not more than 20% by weight, preferably not more than 5% by weight, more preferably not more than 1% by weight, further preferably not more than 0.1% by weight, and particularly preferably not more than 0.02% by weight.

Additionally, the size of the solid particles distributed along the interface between the aqueous and oil phases in the oil-in-water emulsion compositions is not limited to a particular size, and the size is typically not less than 0.01 μm, preferably not less than 0.05 μm, further preferably not less than 0.1 μm, particularly preferably not less than 0.5 μm, and is typically not more than 50 μm, preferably not more than 5 μm, more preferably not more than 3 μm, further preferably not more than 1 μm, particularly preferably not more than 0.9 μm. The size of the solid particles distributed along the interface between the aqueous and oil phases refers to the average particle size of particles that can be observed in enlarged images of particles acquired, for example, by light microscopy or scanning electron microscopy (SEM). A scanning electron microscope is preferably used for the observation. The observed particles may be not less than 5, 40, 100, or 200 in number. In cases where the measurement with a laser diffraction/scattering particle size analyzer is difficult because of, for example, insufficient intensity of diffracted or scattered light, the particle size distribution, average particle size, and median diameter of the solid particles in liquid dispersion form can be measured by dynamic light scattering. The results from dynamic light scattering measurements can be analyzed, for example, by cumulant analysis.

The content of the solid particles in the oil-in-water emulsion compositions according to the first and second embodiments of the present invention is not limited to a particular amount as long as it is within the amount that can typically be contained in the emulsion compositions, and the content is typically not less than 0.01% by weight, preferably not less than 0.05% by weight, further preferably not less than 0.1% by weight, most preferably not less than 0.5% by weight, and is typically not more than 50% by weight, preferably not more than 40% by weight, further preferably not more than 30% by weight, particularly preferably not more than 20% by weight, most preferably not more than 15% by weight, relative to the total weight of the composition.

Any surfactant may be used as the surfactant contained in the oil-in-water emulsion composition according to the first embodiment of the present invention as long as it is a surfactant containing one alkyl group. Surfactants having two alkyl groups are prone to form associations and thus are difficult to use for surface modification. Additionally, in cases where a preliminary step is needed to dissolve a surfactant in an aqueous phase, a surfactant containing one alkyl group is more easily handled than a surfactant having two alkyl groups, also in terms of solubility. In particular, a low-molecular-weight surfactant is preferred, which is a low-molecular-weight surfactant which is a surface-active substance having amphipathic properties and a molecular weight as low as 5,000 or less. Polymers such as proteins, polysaccharides, and synthetic polymers are not included in the low-molecular-weight surfactant.

The low-molecular-weight surfactant may be in any form, such as powder, solid, liquid, or paste. Additionally, the molecular weight of the low-molecular-weight surfactant is more preferably not more than 3,000, most preferably not more than 2,000. The lower molecular weight of the low-molecular-weight surfactant is preferred because it leads to a larger number of moles per weight and a larger number of surfactant molecules that contribute to the reaction with the solid particles. The minimum molecular weight of the low-molecular-weight surfactant is not limited to a particular molecular weight, and the surfactant has a minimum molecular weight of not less than 200 due to the presence of hydrophilic and lipophilic moieties in the structure of the molecule.

Examples of the surfactant include anionic surfactants, cationic surfactants, amphoteric surfactants, and nonionic surfactants.

The alkyl group contained in the surfactant may be a linear or branched alkyl group, and is preferably a linear alkyl group. Additionally, the alkyl group has not less than 8, preferably not less than 10, more preferably not less than 12, further preferably not less than 14, most preferably not less than 16, carbon atoms in chain length. The maximum number of carbon atoms in chain length is not limited to a particular number, and the maximum number of carbon atoms is typically not more than 24, preferably not more than 22. Additionally, the alkyl group in the present embodiment may be saturated or unsaturated, and is more preferably saturated.

The surfactant is preferably, but is not limited to, a surfactant containing any functional group that can react or interact with the surfaces of the solid particles. The adsorption of the surfactant to the solid particles by virtue of such a functional group can result in surface modification of the solid particles. Then, the adsorption of the solid particles to the interface between the aqueous and oil phases is enhanced, which in turn enables production of an emulsion composition having better emulsion stability than that of an emulsion composition prepared using solid particles alone.

Examples of the reaction or interaction between the solid particles and the surfactant include electrostatic interaction, hydrophobic interaction, intermolecular forces interaction, hydrogen bonding, and antigen-antibody reaction. Additionally, examples of a functional group contained in the surfactant that helps achieve the reaction or interaction between those components include cationic group, anionic group, amino acid residue, hydroxy group, carboxyl group, peptide, protein, and antigen, and preferably include cationic group, anionic group, amino acid residue, hydroxy group, carboxyl group, and peptide.

The functional group that helps achieve electrostatic interaction and hydrogen bonding is more preferred to be a hydrophilic group exhibiting a high degree of electronic polarization in the molecular structure. Specifically, in cases where the surfactant contains hydroxy groups, the surfactant is preferably a polyol containing two or more hydroxy groups, further preferably containing three or more hydroxy groups, most preferably four or more hydroxy groups. In cases where the surfactant contains ether groups, the surfactant is preferably a polyether containing two or more ether groups, further preferably containing three or more ether groups, most preferably containing four or more ether groups. Similarly, preferred examples of the surfactant include polycarbonyls, polythiols, and polyamides.

As the surfactant containing hydroxy or ether groups, a food-grade emulsifier that can be used for foods and beverages is preferred for use in food applications.

Examples of the food-grade emulsifier containing hydroxy or ether groups include sucrose fatty acid esters, glycerol fatty acid esters, polyglycerol fatty acid esters, sorbitan fatty acid esters, polyoxyethylene sorbitan fatty acid esters, propylene glycol fatty acid esters, lactylate esters of fatty acids such as calcium stearoyl lactylate and sodium stearoyl lactylate, enzymatically decomposed lecithin; and organic acid monoglycerides, such as acetic acid monoglycerides, citric acid monoglycerides, lactic acid monoglycerides, succinic acid monoglycerides, and diacyltartaric acid monoglycerides. Among those surfactants, sucrose fatty acid esters, polyglycerol fatty acid esters, sorbitan fatty acid esters, and polyoxyethylene sorbitan fatty acid esters, each of which contains a polyol or polyether structure suitable for achieving electrostatic interaction, are preferred; sucrose fatty acid esters, polyglycerol fatty acid esters, and polyoxyethylene sorbitan fatty acid esters are further preferred; sucrose fatty acid esters and polyglycerol fatty acid esters are most preferred.

Specific examples of the food-grade emulsifier containing hydroxy or ether groups include polyglycerol fatty acid esters containing one alkyl group and having a glycerol polymerization degree of not less than 4, preferably a glycerol polymerization degree of 4 to 12, such as decaglycerol myristic acid ester, decaglycerol palmitic acid ester, decaglycerol stearic acid ester, and decaglycerol oleic acid ester; glycerol monofatty acid esters, such as glycerol monomyristate, glycerol monopalmitate, glycerol monostearate, and glycerol monooleate; diglycerol fatty acid esters containing one alkyl group, such as diglycerol myristic acid ester, diglycerol palmitic acid ester, diglycerol stearic acid ester, and diglycerol oleic acid ester; triglycerol fatty acid esters containing one alkyl group, such as triglycerol myristic acid ester, triglycerol palmitic acid ester, triglycerol stearic acid ester, and triglycerol oleic acid ester; organic acid esters of monoglycerides, such as esters of succinic acid, citric acid, or diacetyltartaric acid and monoglycerides of saturated or unsaturated $C_{12}$-$C_{22}$ fatty acids; polyglycerol condensed ricinoleates containing one alkyl group, such as tetraglycerol ricinoleate; sorbitan fatty acid esters containing one alkyl group, such as sorbitan myristic acid ester, sorbitan palmitic acid ester, sorbitan stearic acid ester, and sorbitan oleic acid ester; propylene glycol fatty acid esters containing one alkyl group, such as propylene glycol myristic acid ester, propylene glycol palmitic acid ester, propylene glycol stearic acid ester, and propylene glycol oleic acid ester; sucrose fatty acid esters containing one alkyl group, such as sucrose myristic acid ester, sucrose palmitic acid ester, sucrose stearic acid ester, and sucrose oleic acid ester; and water-soluble phospholipids, such as lysolecithin.

The food grade emulsifier is a mixture of materials which vary in the number of bound alkyl groups relative to plural hydroxy groups capable of forming ester linkages in the molecular structure of the hydrophilic group, and thus preferably contains a monoester(s) having a structure with one alkyl group at a high ratio in the mixture, and preferably contains a monoester(s) at a content of not less than 40% by weight, more preferably not less than 50% by weight, further preferably not less than 60% by weight, and most preferably not less than 70% by weight.

Examples of commercially available products of the above-described sucrose fatty acid esters include "RYOTO Sugar ester S-1670," "RYOTO Sugar ester S-1570," "RYOTO Sugar ester S-1170," "RYOTO Sugar ester S-970," "RYOTO Sugar ester P-1670," "RYOTO Sugar ester P-1570," "RYOTO Sugar ester M-1695," "RYOTO Sugar ester O-1570," "RYOTO Sugar ester L-1695," "RYOTO Sugar ester LWA-1570," and "RYOTO Monoester P" (all of which are manufactured under the trade name RYOTO by Mitsubishi-Chemical Foods Corporation); and "DK ESTER SS," "DK ESTER F-160," "DK ESTER F-140," and "DK ESTER F-110" (all of which are manufactured under the trade name DK ESTER by DKS Co., Ltd.).

Among the above-described polyglycerol fatty acid esters, polyglycerol fatty acid esters having an average glycerol polymerization degree of 2 to 20 are preferred, and those having an average glycerol polymerization degree of 2 to 10 are more preferred.

Examples of commercial products of the polyglycerol fatty acid esters include "RYOTO Polyglycerol ester S-10D," "RYOTO Polyglycerol ester SWA-10D," "RYOTO Polyglycerol ester SWA-15D," "RYOTO Polyglycerol ester SWA-20D," "RYOTO Polyglycerol ester P-8D," "RYOTO Polyglycerol ester M-7D," "RYOTO Polyglycerol ester M-10D," "RYOTO Polyglycerol ester O-15D," "RYOTO Polyglycerol ester L-7D," and "RYOTO Polyglycerol ester L-10D" (all of which are manufactured under the trade name RYOTO by Mitsubishi-Chemical Foods Corporation); "SY-GLYSTER MSW-7S," "SY-GLYSTER MS-5S," "SY-GLYSTER MO-7S," "SY-GLYSTER MO-5S," "SY-GLYSTER ML-750," and "SY-GLYSTER ML-500" (all of which are manufactured under the trade name SY-GLYSTER by Sakamoto Yakuhin Kogyo Co., Ltd.); "Sunsoft Q-14F," "Sunsoft Q-12F," "Sunsoft Q-18S," "Sunsoft Q-182S," "Sunsoft Q-17S," "Sunsoft Q-14S," "Sunsoft Q-12S," "Sunsoft A-121C," "Sunsoft A-141C," "Sunsoft A-121E," "Sunsoft A-141E," "Sunsoft A-171E," and "Sunsoft A-181E" (all of which are manufactured under the trade name Sunsoft by Taiyo Kagaku Co., Ltd.); "POEM TRP-97RF," "POEM J-0021," "POEM J-0081HV," and "POEM J-0381V" (all of which are manufactured under the trade name POEM by Riken Vitamin Co., Ltd.); and "NIKKOL Hexaglyn 1-M," "NIKKOL Hexaglyn 1-L," "NIKKOL Decaglyn 1-SV," "NIKKOL Decaglyn 1-OV," "NIKKOL Decaglyn 1-M," and "NIKKOL Decaglyn 1-L" (all of which are manufactured under the trade name NIKKOL by Nikko Chemicals Co., Ltd.).

Examples of commercial products of the polyoxyethylene sorbitan fatty acid esters include "EMASOL S-120V," "EMASOL L-120V," "EMASOL O-120V," "RHEODOL TW-S120V," "RHEODOL TW-L120," "RHEODOL TW-O120V," "RHEODOL TW-L106," "RHEODOL TW-P120," "RHEODOL TW-O320V," "RHEODOL Super TW-L120," "RHEODOL 440V," and "RHEODOL 460V" (all of which are manufactured under the trade names of EMASOL and RHEODOL by Kao Corporation); "SORGEN TW-60F," "SORGEN TW-20F," and "SORGEN TW-80F" (all of which are manufactured under the trade name of SORGEN by DKS Co., Ltd.); "Admul T60K" and "Admul T80K" (all of which are manufactured under the trade name of Admul by Kerry Inc.); "T-Maz 60K" and "T-Maz 80K" (all of which are manufactured under the trade name of T-Maz by BASF SE); "WILSURF TF-60" and "WILSURF TF-80" (all of which are manufactured under the trade name of WILSURF by NOF Corporation); and "Glycosperse S-20K FG" and "Glycosperse O-20K FG" (all of which are manufactured under the trade name of Glycosperse by Lonza Group AG).

Among the above-described sucrose fatty acid esters and polyglycerol fatty acid esters, food-grade emulsifiers which have an effect on heat-resistant bacteria (namely, bacteriostatic emulsifiers) may be used. Sucrose fatty acid esters and polyglycerol fatty acid esters, each having a $C_{14}$-$C_{22}$ alkyl group, are more preferred, and sucrose fatty acid esters and polyglycerol fatty acid esters, each containing a $C_{16}$-$C_{18}$ fatty acid, are further preferred, all of which are highly effective against heat-resistant bacteria and are thus suitable. The sucrose fatty acid esters and polyglycerol fatty acid esters that can be used contain a monoester(s) at a content of not less than 50% by weight, preferably not less than 60% by weight, further preferably not less than 70% by weight, which are highly effective against heat-resistant bacteria and are thus suitable. Among the polyglycerol fatty acid esters, polyglycerol fatty acid esters having an average polymerization degree of 2 to 5 in the polyglycerol moiety are preferred and, furthermore, polyglycerol fatty acid esters having an average polymerization degree of 2 to 3 are most preferred because of their high effectiveness against bacteria.

Furthermore, the functional group that helps achieve electrostatic interaction preferably contains an ionically-polarizable functional group, namely ionizable functional group. As the ionizable functional group, further preferably at least one each of anionic and cationic groups, more preferably at least one of anionic and cationic group, most preferably only a cationic group is contained in the surfactant.

Examples of the surfactant having an ionizable functional group include ionic surfactants, such as anionic surfactants, cationic surfactants, and amphoteric surfactants.

Examples of the surfactant containing at least one cationic group include amphoteric surfactants and cationic surfactants.

Specific examples of the ionic surfactants used in food applications include lactylate esters of fatty acids such as calcium stearoyl lactylate and sodium stearoyl lactylate; fatty acid salts, such as sodium stearate and sodium oleate; enzymatically decomposed lecithin, succinic acid monoglycerides, and diacyltartaric acid monoglycerides.

Lysolecithin (enzymatically decomposed lecithin) is produced from lecithin by enzymatic degradation to remove either one of the fatty acids (acyl groups) linked to positions 1 and 2 of a glycerophospholipid. Lysolecithin can be obtained by hydrolysis of lecithin with an acid or alkali catalyst, or can also be obtained by hydrolysis of lecithin with phospholipase A1 or A2. Lysophosphatidic acid, lysophosphatidylglycerol, lysophosphatidylinositol, lysophosphatidylethanolamine, lysophosphatidylmethylethanolamine, lysophoshatidylcholine (lysolecithin), lysophosphatidylserine, and the like are listed as lyso-compounds represented by the above-described lysolecithin. In this respect, various types of lecithin are from plant sources, such as soybean, corn, peanut, rapeseed, wheat, and sunflower; animal sources, such as egg yolk, cow, and milk; and microorganism sources.

Specific examples of the cationic surfactant include ammonium cationic surfactants and sulfate cationic surfactants; specifically, among quaternary ammonium salts, alkyltrimethylammonium salts include butyltrimethylammonium chloride, hexyltrimethylammonium chloride, octyltrimethylammonium chloride, decyltrimethylammonium chloride, dodecyltrimethylammonium chloride, tetradecyltrimethylammonium chloride, hexadecyltrimethylammonium chloride, stearyltrimethylammonium chloride, butyltrimethylammonium chloride, hexyltrimethylammonium bromide, octyltrimethylammonium bromide, decyltrimethylammonium bromide, dodecyltrimethylammonium bromide, tetradecyltrimethylammonium bromide, hexadecyltrimethylammonium bromide, stearyltrimethylammonium bromide, and the like.

Additionally, tertiary amides/amines include stearamidopropyl dimethylamine, stearamidopropyl diethylamine, stearamidoethyl diethylamine, stearamidoethyl dimethylamine, palmitamidopropyl dimethylamine, palmitamidopropyl diethylamine, palmitamidoethyl diethylamine, palmitamidoethyl dimethylamine, behenamidopropyl dimethylamine, behenamidopropyl diethylamine, behenamidoethyl diethylamine, behenamidoethyl dimethylamine, arachidamidopropyl dimethylamine, arachidamidopropyl diethylamine, arachidamidoethyl diethylamine, arachidamidoethyl dimethylamine, diethylaminoethyl stearamide, and the like.

Among those cationic surfactants, preferably quaternary ammonium salts are preferred in terms of dispersibility, and hexadecyltrimethylammonium bromide is further preferred.

The HLB value of the surfactant is not limited to a particular value, and it is preferably greater than 8, more preferably not less than 9, further preferably not less than 10. In this respect, the HLB value refers to a value representing the balance between hydrophilicity and hydrophobicity, which is typically used in the surfactant field, and commonly used formulae, such as the formulae in Griffin's method, Davies' method, and Kawakami's method, and formulae in Conceptual Chart for Organic Compounds, can be used to obtain HLB values. Additionally, the HLB values described in catalogs or the like may be used.

The content of the surfactant in the oil-in-water emulsion compositions according to the first and second embodiments of the present invention is not limited to a particular amount as long as it is within the amount that can typically be contained in the emulsion compositions, and the content is typically not less than 0.00001% by weight, preferably not less than 0.00005% by weight, more preferably not less than 0.0001% by weight, most preferably not less than 0.001% by weight, and is typically not more than 0.05% by weight, preferably less than 0.01% by weight, more preferably not more than 0.005% by weight, relative to the total weight of the composition.

Additionally, the concentration of the surfactant in the oil-in-water emulsion compositions is more preferably not higher than the critical micelle concentration of the surfactant. When the concentration of the surfactant is equal to or below the critical micelle concentration of the surfactant, the surfactant can be associated with or adsorbed to solid particles and form a monolayer on the solid particles without forming micelles, and consequently modify the surfaces of the solid particles in an efficient manner, which in turn enables reduction of the added amount of the surfactant.

In the first and second embodiments of the present invention, the surfactant preferably reacts or interacts with the solid particles and, in that case, the content of the surfactant is preferably more than 0 milli-equivalents and less than 60 milli-equivalents relative to 100 parts by weight of the solid particles. Examples of the reaction or interaction between the surfactant and the solid particles include electrostatic interaction, hydrophobic interaction, intermolecular forces interaction, and hydrogen bonding.

The method of analyzing the surfactant contained in the oil-in-water emulsion compositions is not limited to a particular method, and the surfactant can be analyzed, for example, by the following procedures (1) to (3):

(1) each oil-in-water emulsion composition is centrifuged and the resulting supernatant and pellet (the solid particles adsorbed with the surfactant, and the like) are separately recovered and analyzed;

(2) the pellet obtained in (1) is subjected to various methods (salt addition, pH adjustment, washing with a desired solvent such as ethanol, and the like) to remove the surfactant from the pellet and to obtain a surfactant extract; and (3) the supernatant obtained in (1) and the surfactant extract obtained in (2) are identified by a method, such as GPC (see Japanese Unexamined Patent Application Publication No. H8-269075 and the like), LC/MS, LC/MS/MS (see Japanese Unexamined Patent Application Publication No. 2014-122213 and the like), GC/MS, GC/MS/MS, or NMR.

The surfactant in the second embodiment of the present invention is not limited to a particular surfactant, and the surfactant should be a surfactant for use in foods.

Examples of the surfactant that can be used in food applications include sucrose fatty acid esters, glycerol fatty acid esters, polyglycerol fatty acid esters, sorbitan fatty acid esters, polyoxyethylene sorbitan fatty acid esters, propylene glycol fatty acid esters, lactylate esters of fatty acids such as calcium stearoyl lactylate and sodium stearoyl lactylate, lecithin, enzymatically decomposed lecithin, enzyme-treated lecithin; and organic acid monoglycerides, such as acetic acid monoglycerides, citric acid monoglycerides, lactic acid monoglycerides, succinic acid monoglycerides, and diacyltartaric acid monoglycerides; glycolipid, saponin; and fatty acid salts, such as sodium stearate and sodium oleate. Among those surfactants, sucrose fatty acid esters, polyglycerol fatty acid esters, sorbitan fatty acid esters, polyoxyethylene sorbitan fatty acid esters, lactylate esters of fatty acids, enzymatically decomposed lecithin, citric acid monoglycerides, succinic acid monoglycerides, and diacyltartaric acid monoglycerides are preferred; sucrose fatty acid esters, polyglycerol fatty acid esters, polyoxyethylene sorbitan fatty acid esters, lactylate esters of fatty acids, enzymatically decomposed lecithin, succinic acid monoglycerides, and diacyltartaric acid monoglycerides are further preferred; and sucrose fatty acid esters, polyglycerol fatty acid esters, lactylate esters of fatty acids, enzymatically decomposed lecithin, and succinic acid monoglycerides are most preferred.

The oil phase component contained in the oil-in-water emulsion composition according to the first embodiment of the present invention is an edible oil or fat containing an unsaturated bond(s) and/or an oxygen atom(s), while the oil phase component in the second embodiment of the present invention is not limited to a particular material as long as it is an oil or fat that can be used in food applications (hereinafter referred to as "edible oil or fat"), and any edible oil or fat may be used.

Edible oils and fats also include physiologically active oils and fats, liposoluble pigments, and antioxidants. Examples of the edible oil or fat containing an unsaturated bond(s) include higher unsaturated fatty acid hydrocarbons, higher unsaturated fatty acids, animal-derived and plant-derived oils and fats, and isoprenoids including squalene and tocopherol. Examples of the edible oil or fat containing an oxygen atom(s) include higher alcohols, synthetic ester oils, glycol esters of higher fatty acids, saturated fatty acids, and unsaturated fatty acids.

In the oil-in-water emulsion compositions according to the first and second embodiments of the present invention, the contact between the oil phase component and the aqueous phase component can be reduced by the solid particles, or an edible oil or fat containing an unsaturated bond(s) is consequently prevented from oxidation and an edible oil or fat containing an oxygen atom(s) is consequently prevented from hydrolysis, which can in turn prevent generation of the odor of deteriorated edible oil or fats. The deterioration of oils and fats can be evaluated by analyzing the acid value, peroxide value, or carbonyl value of the oil extracted from an emulsion composition. These values are analyzed in accordance with The JOCS Standard Methods for the Analysis of Fats, Oils and Related Materials (edited by Japan Oil Chemist's Society).

As the edible oils and fats, for example, edible oils and fats prepared, for example, by combining one or more selected from the following oils and fats can be used: plant oils and fats, such as rapeseed oil, rice oil, soybean oil, corn oil, safflower oil, sunflower oil, cottonseed oil, sesame oil, olive oil, palm oil, palm kernel oil, coconut oil, linseed oil, macadamia nut oil, tsubaki camellia seed oil, tea camellia seed oil, rice bran oil, and cocoa butter; animal oils and fats, such as milk fat, beef tallow, lard, chicken fat, mutton tallow, and fish oil; hydrogenated oils and processed oils and fats prepared from any of these plant or animal oils and fats in liquid or solid form through oil and fat modification processes including purification, deodorization, separation, hydrogenation, and, transesterification, such as hydrogenated palm oil and hydrogenated palm kernel oil; and liquid oils and solid fats obtained by further separation of these oils and fats. In addition, physiologically active oils and fats may also be used, specifically including docosahexaenoic acid (DHA), eicosapentaenoic acid (EPA), arachidonic acid, α-linolenic acid, γ-linolenic acid, and medium chain fatty acid triglycerides (MCT). These oils and fats may be used individually or in combination as a mixture.

Additionally, liposoluble pigments and antioxidants may also be used, and specific examples of the pigments include carotenoid pigments, such as annatto pigment, β-carotene, paprika pigment, carrot carotene, and *Dunaliella* carotene; *Monascus* pigment, chlorophyll; turmeric pigment such as curcumin (curcuminoid); and food tar dyes.

Specific examples of the antioxidants include plant extracts, such as rosemary extract, tea extract, raw coffee bean extract, grape seed extract, and myrica extract; tocopherol, tocotrienol, ascorbyl palmitate, dibutylhydroxytoluene, and butylhydroxyanisole.

Among those, plant oils and fats, and hydrogenated oils and processed oils and fats prepared from those oils and fats are preferred, and edible oils and fats which are in solid form at a temperature of 25° C. are particularly preferred in terms of taste.

In particular, the edible oils and fats are preferred to have a ratio of preferably not more than 50° by weight, more preferably not more than 30% by weight, further preferably not more than 20% by weight, particularly preferably not more than 10% by weight, most preferably not more than 5% by weight, as the ratio of fatty acids other than saturated fatty acids, namely unsaturated fatty acids including trans fatty acids, in the total fatty acids bound to the triglyceride molecules, which are the main constituents of the edible oils and fats, to have a better taste.

Additionally, for the edible oils and fats, the ratio of fatty acids containing 12 or less carbon atoms in the total fatty acids bound to the triglyceride molecules is preferably not less than 30% by weight.

Additionally, the edible oils and fats are preferred to have an iodine value of typically not more than 60.0, preferably not more than 30.0, more preferably not more than 20.0, further preferably not more than 10.0, most preferably not more than 5.0, to prevent development of oxidized odor by heat and to have a better flavor.

Additionally, the edible oils and fats are preferred to a solid fat content (SFC) at 10° C. of preferably typically not less than 20% by weight, more preferably not less than 30% by weight, further more preferably not less than 40% by weight, most preferably not less than 50% by weight, to prepare a flavorful composition.

In this respect, a solid fat content (SFC) is generally measured by a method based on conventional pulse NMR technique, although using a solid fat index (SFI) determined by thermal analysis will make little difference to results.

Additionally, the edible oils and fats are preferred to have a slip melting point of preferably 10° C. or higher, more preferably 15° C. or higher, further preferably 20° C. or higher, most preferably 25° C. or higher, to prepare a flavorful composition. The edible oils and fats are preferred to have a maximum slip melting point of preferably 70° C. or lower, more preferably 60° C. or lower, further preferably 50° C. or lower, most preferably 45° C. or lower, to provide excellent emulsion stability.

In the first embodiment of the present invention, a composition that is safe enough to be added to foods and has a good taste can be provided by using an oil phase component containing an unsaturated bond(s) and/or an oxygen atom(s), particularly an edible oil or fat, as the oil phase component.

The content of the oil phase component in the oil-in-water emulsion compositions according to the first and second embodiments of the present invention is not limited to a particular amount as long as it is a sufficient amount that enables production of an oil-in-water emulsion composition, and the content is typically not less than 5% by weight, preferably not less than 10% by weight, more preferably not less than 20% by weight, particularly preferably not less than 30% by weight, and is typically not more than 80% by weight, preferably not more than 70% by weight, further preferably not more than 60% by weight, particularly preferably not more than 50° by weight, relative to the total weight of the composition.

The aqueous phase component contained in the oil-in-water emulsion compositions of the first and second embodiments of the present invention should be a component that is typically combined in an emulsion composition and forms an aqueous phase. In addition to water, lower alcohols, polyhydric alcohols, and the like may be contained.

The content of the aqueous phase component in the oil-in-water emulsion compositions according to the present embodiments is not limited to a particular amount as long as it is a sufficient amount that enables production of an oil-in-water emulsion composition, and the content is typically not less than 20% by weight, preferably not less than 30% by weight, more preferably not less than 40% by weight, particularly preferably not less than 50% by weight, and is typically less than 95% by weight, preferably not more than 90% by weight, more preferably not more than 80% by weight, further preferably not more than 70% by weight, relative to the total weight of the composition.

In the first and second embodiments of the present invention, the oil-in-water emulsion compositions may further contain, in addition to the above-described solid particles, surfactant, oil phase component, and aqueous phase component, a surfactant other than the above-described surfactant containing one alkyl group, an oil phase component other than the above-described oil phase component having an unsaturated bond(s) and/or an oxygen atom(s), a coloring agent other than the above-described oil phase component having an unsaturated bond(s) and/or an oxygen atom(s), an antioxidant other than the above-described oil phase component having an unsaturated bond(s) and/or an oxygen atom(s), a sweetening agent, a stabilizing agent, a milk component, a protein, a flavoring agent, a coloring agent, a salt, an organic acid, and the like.

Examples of the surfactant other than the above-described surfactant containing one alkyl group include polyglycerol fatty acid esters containing two or more alkyl groups and having a glycerol polymerization degree of not less than 4, preferably a glycerol polymerization degree of 4 to 12, such as decaglycerol myristic acid ester, decaglycerol palmitic acid ester, decaglycerol stearic acid ester, and decaglycerol oleic acid ester;

fatty acid diesters of glycerol, such as glycerol dimyristate, glycerol dipalmitate, glycerol distearate, and glycerol dioleate;

diglycerol fatty acid esters containing two or more alkyl groups, such as diglycerol myristic acid ester, diglycerol palmitic acid ester, diglycerol stearic acid ester, and diglycerol oleic acid ester;

triglycerol fatty acid esters containing two or more alkyl groups, such as triglycerol myristic acid ester, triglycerol palmitic acid ester, triglycerol stearic acid ester, and triglycerol oleic acid ester;

organic acid esters of diglycerides, such as esters of succinic acid, citric acid, or diacetyltartaric acid and diglycerides of saturated or unsaturated $C_{12}$-$C_{22}$ fatty acids;

polyglycerol condensed ricinoleates containing two or more alkyl groups, such as tetraglycerol ricinoleate;

sorbitan fatty acid esters containing two or more alkyl groups, such as sorbitan myristic acid ester, sorbitan palmitic acid ester, sorbitan stearic acid ester, and sorbitan oleic acid ester;

propylene glycol fatty acid esters containing two or more alkyl groups, such as propylene glycol myristic acid ester, propylene glycol palmitic acid ester, propylene glycol stearic acid ester, and propylene glycol oleic acid ester;

sucrose fatty acid esters containing two or more alkyl groups, such as sucrose myristic acid ester, sucrose palmitic acid ester, sucrose stearic acid ester, and sucrose oleic acid ester; and phospholipid such as lecithin; enzyme-treated lecithin; glycolipid; and saponin.

Examples of the oil phase component other than the above-described oil phase component having an unsaturated bond(s) and/or an oxygen atom(s) include any oil phase components that are used in, for example, the food field, the feed field, the cosmetics field, the pharmaceutical field, and the industrial field.

Examples of the sweetening agent include the following materials:

sugars: monosaccharides, such as glucose, fructose, xylose, sorbose, galactose, and isomerized glucose syrup; disaccharides, such as sucrose, maltose, lactose, isomerized lactose, and palatinose; oligosaccharides, such as fructo-oligosaccharides, malto-oligosaccharides, isomalto-oligosaccharides, galacto-oligosaccharides, coupling sugar, and palatinose;

sugar alcohol: monosaccharide alcohols, such as erythritol, sorbitol, xylitol, and mannitol; disaccharide alcohols, such as maltitol, isomaltitol, and lactitol; trisaccharide alcohols, such as maltotriitol, isomaltotriitol, and pinitol; tetrasaccharide alcohols or higher sugar alcohols, such as oligosaccharide alcohols; powder-reconstituted maltose syrup, and the like;

high intensity sweetening agents: aspartame, neotame, sucralose, stevia, and the like.

Examples of the stabilizing agent include galactomannan, xanthan gum, carrageenan, gum arabic, tamarind gum, gellan gum, glucomannan, and cellulose.

Examples of the milk component include liquid materials, such as cow milk, processed milk, skimmed milk, fresh cream, whey, butter milk, sweetened condensed milk, and sugar-free condensed milk; and powdered milk products, such as whole milk powder, skimmed milk powder, nutrient-modified milk powder, powdered cream, powdered whey, and butter milk powder. Butter milk and butter milk powder are particularly preferred. Butter milk is also referred to as butter serum and is the fluid remaining when cream is prepared by, for example, centrifugation of cow milk and the resulting cream is, for example, churned to remove the milk fat as butter; examples of the butter milk includes condensed butter milk in liquid form obtained by condensation of butter milk, and butter milk powder in powder form obtained by spray drying of condensed butter milk. These may be used individually or in combination of two or more. Although an additional step of fermentation by acid-generating bacteria or addition of an acid such as organic acid may be added to the process of separating cream or butter from cow milk, the above-described fermentation or addition of an acid is not performed on butter milk used in the present invention.

As the butter milk, commercial products such as "butter milk powder" manufactured by Yotsuba Milk Products Col, Ltd. can be used.

The protein may be an animal protein or a plant protein. Examples of the animal protein can include egg-derived materials, such as egg yolk, egg white, whole egg, and proteins isolated therefrom, including ovalbumin, conalbumin, ovomucoid, and ovoglobulin; and cow milk-derived materials, such as milk serum proteins, casein and casein salts such as sodium caseinate, potassium caseinate, magnesium caseinate, and calcium caseinate, β-lactoglobulin, α-lactoalbumin, serumalbumin, and immunoglobulin. Examples of the plant protein can include soybean-derived materials, such as defatted soy flour, soybean protein concentrate, soybean protein isolate, soybean protein extract, and proteins isolated therefrom, including 7S globulin and 11S globulin Any flavoring agent may be used as the flavoring agent. Examples of the flavoring agent include vanilla flavoring agents, such as vanilla essence; and milk flavoring agents, such as milk flavor, and butter flavor. A milk flavoring agent is particularly preferred as the flavoring agent, and the milk flavoring agent is not limited to a particular flavoring agent as long as it is a flavor containing an aroma component of milk and a flavor component characteristic of milk. Although the milk flavoring agent may be a chemically synthesized flavoring agent or a flavoring agent prepared by extraction and purification from milk, or a mixture thereof, milk flavoring agents prepared from milk as a raw material are more preferred, and milk flavoring agents prepared by an enzymatic reaction on milk components are further preferred because of the ability to reproduce the flavor of natural milk. These may be used individually or in combination of two or more.

Any coloring agent may be used as the coloring agent other than the above-described oil phase component having an unsaturated bond(s) and/or an oxygen atom(s). Examples of the coloring agent include safflower pigment, gardenia pigment, cochineal pigment, cacao pigment, caramel pigment, and riboflavin butyrate (VB2).

Any antioxidant may be used as the antioxidant other than the above-described oil phase component having an unsaturated bond(s) and/or an oxygen atom(s).

Examples of the antioxidant include water-soluble plant extracts, L-ascorbic acid and ascorbate salts, and erythorbic acid and erythorbate salts.

Examples of the salt include chlorides, such as sodium chloride, potassium chloride, and magnesium chloride; carbonate salts, such as sodium carbonate, potassium carbonate, and calcium carbonate; bicarbonate salts, such as sodium bicarbonate; phosphate salts, such as disodium hydrogen phosphate, trisodium phosphate, dipotassium hydrogen phosphate, and tripotassium phosphate; sodium polyphosphate; citrate salts, such as sodium citrate; and sodium lactate. Salts containing magnesium are particularly preferred as the salt, and examples of magnesium-containing salts that can be used in food applications include milk serum mineral, magnesium chloride, magnesium oxide, magnesium carbonate, magnesium sulfate, bittern (crude magnesium chloride from seawater), dolomite, unrefined salt, magnesium stearate, magnesium hydrogen phosphate, trimagnesium phosphate, magnesium silicate, magnesium hydroxide, magnesium acetate, magnesium citrate, magnesium malate, magnesium benzoate, magnesium gluconate, magnesium L-glutamate, sepiolite, talc, and phytin.

Examples of the organic acid include fumaric acid, succinic acid, citric acid, tartaric acid, diacetyltartaric acid, malic acid, adipic acid, glutaric acid, and maleic acid.

The oil-in-water emulsion compositions of the first and second embodiments of the present invention each have an emulsion structure where the solid particles are distributed along the interface between the oil phase component and the aqueous phase component. Additionally, the oil-in-water emulsion compositions each preferably have an emulsion structure where the solid particles are distributed along the interface between a continuous phase and a discontinuous phase. The presence of such a structure allows an oil-in-water emulsion composition to have temperature drop resistance and heat resistance and to contain particles with a uniform particle size, regardless of before or after heating.

In the above-described structures of the oil-in-water emulsion compositions, the size of discontinuous phase droplets, namely the diameter of oil phase droplets in an O/W emulsion or the diameter of oil phase droplets including the innermost aqueous phase in a W/O/W emulsion, is preferably not less than 0.5 μm and not more than 1 mm, more preferably not less than 0.7 μm and not more than 500 μm, further preferably not less than 1 μm and not more than 100 μm, particularly preferably not less than 1 μm and not more than 50 μm, in view of stability, food texture, and tactile impression. The diameter of discontinuous phase droplets can be adjusted to a desired size by appropriately coordinating the agitation speed and the length of agitation time in the emulsification process for an emulsion composition.

Such an emulsion structure can be confirmed by polarization microscopy. Additionally, the size of discontinuous phase droplets refers to the average major axis length of discontinuous phase droplets that can be identified by polarization microscopy. Discontinuous phase droplets to be identified may be 10 or more, 50 or more, 100 or more, or 200 or more in number.

In addition, a laser diffraction/scattering particle size analyzer or a measurement instrument for dynamic light scattering can be used to measure the size of discontinuous phase droplets in the above-described oil-in-water emulsion compositions, namely the particle size distribution, median diameter, and average particle size of oil phase droplets in the O/W emulsions.

The oil-in-water emulsion compositions of the first and second embodiments of the present invention each preferably show a small difference in the diameter of emulsion droplets, namely the diameter of the above-described discontinuous phase droplets, before and after heating at 121° C. For the change in the diameter before and after heating, the change in the median diameter (D50) of droplets in the oil-in-water emulsion composition after heating from the median diameter (D50) of droplets in the oil-in-water emulsion composition before heating may be calculated as ±30% or less, ±20% or less, ±10% or less, ±5% or less, ±3% or less based on that the median diameter (D50) of droplets in the oil-in-water emulsion composition before heating is regarded as 100%.

The oil-in-water emulsion compositions of the first and second embodiments of the present invention may contain any active component, which can be expected to exert a desired physiological effect in biological bodies, in the oil phase or the solid particles. The presence of the active component enables production of functional foods excellent in stability. The forms of the functional foods can include, but are not limited to, retort-processed dietary supplement and liquid diet as well as commonly consumed foods, such as nutritional supplement drink, nutritional tonics, recreational beverages, and chilled sweets. Examples of the active component that can be expected to exert a physiological effect include fats, trace elements, vitamins, amino acids, minerals, and medicinal ingredients derived from any natural materials or synthetic compounds.

The oil-in-water emulsion compositions of the first and second embodiments of the present invention are preferred have heat resistant to a temperature of 60° C. or higher and preferred to have heat resistance to a temperature of 70° C. or higher. In this respect, the heat resistance refers to no separation of the oil phase after heating, more preferably refers to a percent change of 30%, preferably not more than 20%, further preferably not more than 10%, particularly preferably not more than 5%, as the percent change in the average particle size and median diameter of emulsion particles between before and after heating, in addition to no separation of the oil phase after heating.

Any solid particles may be used as the solid particles contained in the oil-in-water emulsion composition according to the third embodiment of the present invention as long as those solid particles are not dissolved but are dispersible in the aqueous and oil phase components to be used and the aqueous phase and/or the oil phase can be agitated even after the solid particles are added to the aqueous phase component and/or the oil phase component. In this respect, by the term "dispersible," it is meant that the composition contains no extremely large aggregates (aggregates of several hundred μm to several mm in size) observed by microscopy and keeps the fluidity when agitated. Examples of the solid particles include particles of inorganic materials, organic materials, and organic-inorganic composite materials.

The solid particles used in the third embodiment of the present invention form a contact angle of 90.0 degrees or less, preferably 80.0 degrees or less, particularly preferably 40.0 degrees or less, with the aqueous phase component. The use of solid particles forming a contact angle equal to or below the above-described upper limit with the aqueous phase component promotes formation of a structure where the solid particles are distributed along the interface between the oil phase component and the aqueous phase component. The minimum contact angle of the aqueous phase component to the solid particles is not limited, and it is typically 0 degrees or more, preferably 5.0 degrees or more, and more preferably 10.0 degrees or more.

Furthermore, the solid particles to be used form a contact angle of 8.0 degrees or more, preferably 9.0 degrees or more, more preferably 10.0 degrees or more, with the below-described oil phase component. The use of solid particles forming a contact angle equal to or above the above-described lower limit with the oil phase component promotes formation of a structure where the solid particles are distributed along the interface between the oil phase component and the aqueous phase component. The maximum contact angle of the oil phase component to the solid particles is typically less than 180.0 degrees, preferably 120.0 degrees or less, more preferably 90.0 degrees or less, further preferably 60.0 degrees or less, and particularly preferably 30.0 degrees or less.

The oil-in-water emulsion composition according to the third embodiment of the present invention has a structure where the solid particles are distributed along the interface between the oil phase component and the aqueous phase component; an oil-in-water emulsion composition containing particles with a uniform particle size, regardless of before or after heating, and having heat resistance and temperature drop resistance can be provided by the use of the solid particles that form particular contact angles with the aqueous and oil phase components, which are involved in the formation of the emulsion structure.

The above-described structure where the solid particles are distributed along the interface between the oil phase component and the aqueous phase component refers to a structure where the solid particles are adsorbed to the interface between the oil phase component and the aqueous phase component. The presence of the solid particles allows dispersion of the oil phase in the aqueous phase and formation of a so-called Pickering emulsion, which specifically refers to a structure where at least a portion of the solid particles are adsorbed to the surface of the oil phase dispersed in the aqueous phase.

In the method of measuring the above-described contact angle, solid particles are compressed into a tablet, and an aqueous or oil phase component is dropped by gravity to the resulting tablet, and the contact angle is measured using a contact angle measuring instrument. More specifically, the measurement method described in Examples can be used for the measurement. The contact angles formed by the aqueous and oil phase components of an oil-in-water emulsion composition are measured using the same aqueous and oil phase components used as raw materials; in cases where raw materials for the aqueous and oil phase components are unidentified, the aqueous and oil phases are isolated from the oil-in-water emulsion composition and the resulting aqueous and oil phases with removal of impurities are used as the aqueous and oil phase components to measure contact angles. Additionally, the main component of the aqueous or oil phase may be used as the aqueous or oil phase component to measure contact angles. Water is particularly preferred as the main component of the aqueous phase.

Additionally, the contact angles formed by the aqueous and oil phase components to the solid particles can be modified by hydrophobizing or hydrophilizing the surfaces of the solid particles. The method of hydrophobizing or hydrophilizing the surfaces of the solid particles is not limited, and may be a chemical or physical treatment. Examples of the chemical treatment include a surface modification method based on incorporation of a surface modifying substance into solid particles through covalent bonds, and a method designed to alter the charges on functional groups or the orientation of the functional groups which are inherently present in solid particles. In the physical treatment, for example, a surface modifying substance can be incorporated by any ligand-receptor interaction, such as electrostatic interaction, hydrophobic interaction, intermolecular forces interaction, hydrogen bonding, coordinate bonding, chelate bonding, and antigen-antibody reaction. In this respect, the surface modifying substance is not limited to a particular substance as long as it is available for any modification of the solid particles. Examples of the substance include organic materials other than solid particles, such as amphipathic substances, surfactants, antigens, antibodies, enzymes, nucleic acids, proteins, protein degradation products, peptides, amino acids, sugar chains, and polysaccharides; inorganic materials other than solid particles, such as silica particles, talc, and titanium oxide; and inorganic-organic composite materials other than solid particles. The surface modifying substance may be a naturally-occurring substance or a synthetic substance.

Examples of the inorganic materials used as the solid particles include silica particles, such as spherical silica and fumed silica; ceramics, such as talc, titanium oxide, and hydroxyapatite; and calcium carbonate. Examples of organic materials that are used as the solid particles include polysaccharides, such as chitin, chitosan, cellulose, microcrystalline cellulose, hydroxypropyl methylcellulose, hydroxy cellulose, methylcellulose, fermented cellulose, sodium carboxymethylcellulose, gellan gum, native gellan gum, xanthan gum, carrageenan, dextrin, indigestible dextrin, soybean polysaccharides, pectin, alginic acid, propylene glycol alginate, tamarind seed gum, Tara gum, karaya gum, guar gum, locust bean gum, tragacanth gum, ghatti gum, pullulan, gum arabic, agar, furcellaran, inulin, and konjac mannan; polymers, such as polylactic acid, polyvinyl alcohol, and polyethylene glycol; oligomers, Janus particles, cyclodextrin; animal proteins, such as whey and casein; plant proteins, such as soybean proteins and zein; microorganism-derived proteins, such as hydrophobins; enzymes, protein degradation products, peptides, microorganisms, spores, cells; plant extracts, such as flavonoids; ground food products, such as ground gel products, ground protein gel products and cereal powder; and complexes and derivatives thereof. The solid particles may be synthetic or natural. Particularly in cases of polysaccharide- and polymer-based particles, the polysaccharide and the polymer may be linear (for example, cellulose), branched (for example, glucomannan and the like), side-chain (for example, galactomannans), or spherical (for example, gum arabic, soybean polysaccharides). The polysaccharide may be an acidic, neutral, or basic polysaccharide. Examples of the organic-inorganic composite materials used as the solid particles include Fe-containing ferritin, gel particles prepared from sodium alginate and a calcium salt, and the like. Particularly in cases where the solid particles are composed of a protein, the solid particles preferably contain no casein or β-lactoglobulin, which are highly allergenic, and further preferably no milk-derived proteins in terms of removing allergens. Additionally, casein and β-lactoglobulin are preferably used after being hydrolyzed by, for example, an enzyme or acid to low-molecular-weight compounds which are too small to be allergenic. Additionally, the solid particles preferably contain no components derived from roasted coffee beans because this prevents ingestion of acrylamide that is formed during the coffee bean roasting process, enables to reduce the influence of the deep and dark color of roasted coffee beans, and does not limit the applications of the oil-in-water emulsion composition itself and of foods and beverages supplemented with the emulsion composition; furthermore, the solid particles further preferably contain no components derived from coffee beans because this prevents the taste and flavor of coffee from influencing the oil-in-water emulsion composition itself and foods and beverages supplemented with the emulsion composition, which in turn does not limit their applications. The solid particles before being dispersed in the aqueous or oil phase component may be in powder form, paste form, or pellet form.

In cases where starch particles are used alone as the solid particles, it is difficult for the whole composition to keep a constant viscosity upon heat sterilization and, once gelatinized, starch may also be precipitated and separated through aging and crystallization. Thus, in the present embodiment, solid particles composed of starch are preferably not used as primary solid particles. The term "primary solid particles" refers to a type of solid particles having the highest content among all the solid particles. The content of starch relative to the total solid particle weight is preferably less than 50% by weight, more preferably not more than 40% by weight, further preferably not more than 25% by weight, particularly preferably not more than 1% by weight, and most preferably zero.

By the term "solid," it is meant that the composition has no fluidity at temperatures in the time frame from preparation to consumption.

The shape of the solid particles is not limited, and examples of the solid particle shape include spherical shapes, rod shapes, cubic shapes, string shapes, gel shapes, mesh shapes, porous shapes, needle shapes, flake shapes, and aggregate shapes. The solid particles may be separated particles, aggregated particles, or associated particles. In cases where each of the solid particles are composed of a single polymer, those solid particles are preferred to have an entanglement structure or a cross-linking structure through hydrogen bonding, ion bonding, or intermolecular force interaction. The solid particles may be composed of a single type of material or may be composed of a mixture, aggregate, or association of different types of materials. In cases where the solid particles are in a gel form, the solid particles may be shrunk or swelled. The solid particles may contain any active component inside or carry any active component on the surface.

In cases where silica is used, either hydrophilic or hydrophobic silica may be used, and hydrophilic silica is preferred in terms of safety and cost, with consideration given to the use of silica in the food field and the pharmaceutical field. Any known method may be used to impart hydrophilicity or hydrophobicity to silica, and examples of the method include surface treatment with a silane coupling agent.

For use in the food field, the solid particles should be edible and may be food additives or food raw materials. For the solid particles, a single type of solid particles or a combination of two or more types of solid particles may be used.

The primary particle size of the solid particles is not limited to a particular size, and is typically not less than 0.001 µm, preferably not less than 0.01 µm, more preferably not less than 0.04 µm, and is typically not more than 50 µm, preferably not more than 10 µm, more preferably less than 5 µm, particularly preferably less than 1 µm. The primary particle size of the solid particles refers to the average particle size of particles that can be observed in enlarged images of particles acquired, for example, by scanning electron microscopy (SEM). The observed particles may be not less than 5, 30, 40, 100, or 200 in number. The catalog value of the primary particle size may be used as the primary particle size of the solid particles.

The average particle size of the solid particles is not limited to a particular size, and the average particle size of the solid particles in a dilute dispersion is typically not less than 0.01 µm, preferably not less than 0.05 µm, further preferably not less than 0.1 µm, particularly preferably not less than 0.2 µm, and is typically not more than 50 µm, preferably not more than 10 µm, more preferably less than 5 µm, further preferably less than 3 µm, particularly preferably less than 1 µm.

The median diameter of the solid particles is not limited to a particular diameter, and the median diameter of the solid particles in a dilute dispersion is typically not less than 0.01 µm, preferably not less than 0.05 µm, further preferably not less than 0.1 µm, particularly preferably not less than 0.2 µm, and is typically not more than 50 µm, preferably not more than 10 µm, more preferably less than 5 µm, further preferably less than 3 µm, particularly preferably less than 1 µm. For the size of the solid particles in a liquid, a laser diffraction/scattering particle size analyzer can be used, for example, to measure the particle size distribution, average particle size, and median diameter of the solid particles in powder form or liquid dispersion form. In this respect, the term "dilute" refers to any concentration that can be determined by, for example, a flow method using a laser diffraction/scattering particle size analyzer. The concentration to be measured is typically not more than 20% by weight, preferably not more than 5% by weight, more preferably not more than 1% by weight, further preferably not more than 0.1% by weight, and particularly preferably not more than 0.02% by weight. In cases where the measurement with a laser diffraction/scattering particle size analyzer is difficult because of, for example, insufficient intensity of scattered light, the particle size distribution, average particle size, and median diameter of the solid particles in liquid dispersion form can be measured by dynamic light scattering. The results from dynamic light scattering measurements can be analyzed, for example, by cumulant analysis.

Additionally, the size of the solid particles distributed along the interface between the aqueous and oil phases in the oil-in-water emulsion compositions is not limited to a particular size, and the size is typically not less than 0.01 µm, preferably not less than 0.05 µm, further preferably not less than 0.1 µm, particularly preferably not less than 0.5 µm, and is typically not more than 50 µm, preferably not more than 5 µm, more preferably not more than 3 µm, further preferably not more than 1 µm, particularly preferably not more than 0.9 µm. The size of the solid particles distributed along the interface between the aqueous and oil phases refers to the average particle size of particles that can be observed in enlarged images of particles acquired, for example, by light microscopy or scanning electron microscopy (SEM). A scanning electron microscope is preferably used for the observation. The observed particles may be not less than 5, 40, 100, or 200 in number.

The ratio of the solid particles in the oil-in-water emulsion composition according to the third embodiment of the present invention is not limited to a particular ratio as long as it is within the amount that can typically be contained in the emulsion compositions, and the ratio is typically not less than 0.01% by weight, preferably not less than 0.05% by weight, further preferably not less than 0.1% by weight, most preferably not less than 0.5% by weight, and is typically not more than 50% by weight, preferably not more than 40% by weight, more preferably not more than 30% by weight, further preferably not more than 20% by weight, particularly preferably not more than 15% by weight, relative to the total weight of the composition.

The solid particles used in the third embodiment of the present invention has an L value of typically not less than 31, preferably not less than 40, more preferably not less than 50, further preferably not less than 62, still further preferably not less than 70, yet further preferably not less than 75, particularly preferably not less than 80, and most preferably not less than 90. The upper limit of the L value is not limited, and it is typically not more than 100. The solid particles having such a high L value contribute to better appearance of the oil-in-water emulsion composition. On the other hand, examples of solid particles having a low L value which is outside the above-described L value range include components derived from roasted coffee beans and having a deep and dark color, which have a tendency to have a lower L value with a higher roasting degree and are likely to have adverse effects on the appearance of the oil-in-water emulsion composition (reference data: raw Robusta coffee beans from Indonesia, L value of 57; raw Arabica coffee beans from Colombia, L value of 55; roasted Arabica coffee beans from Colombia (light roast, medium roast, dark roast), L values of 32, 20, and 16).

The L value of the solid particles can be measured using a colorimeter. The L value represents a measure of brightness for each color and is expressed by a number ranging from 0 to 100. An L value of 100 indicates the brightest color (infinite white), while an L value of 0 indicates the darkest color (infinite black). The measurement can be performed by any known method using a colorimeter.

The oil phase component contained in the oil-in-water emulsion composition according to the third embodiment of the present invention is not limited to a particular oil phase component, and it should be an oil phase component used in emulsion compositions. The oil phase component may be an oil phase component containing an unsaturated bond(s) and/or an oxygen atom(s).

Examples of the oil phase component containing an unsaturated bond(s) include higher unsaturated fatty acid hydrocarbons, higher unsaturated fatty acid, animal-derived and plant-derived oils and fats, and isoprenoids including squalene and tocopherol. Examples of the oil phase component containing an oxygen atom(s) include higher alcohols, synthetic ester oils, glycol esters of higher fatty acids, saturated fatty acids, and unsaturated fatty acids.

The oil phase component preferably contains an edible oil or fat. The edible oil or fat is not limited to a particular oil or fat, and any edible oil or fat may be used as long as it is for use in food applications; for example, edible oils and fats prepared, for example, by combining one or more selected from the following oils and fats can be used: plant oils and fats, such as rapeseed oil, rice oil, soybean oil, corn oil, safflower oil, sunflower oil, cottonseed oil, sesame oil, olive oil, palm oil, palm kernel oil, coconut oil, linseed oil, macadamia nut oil, tsubaki camellia seed oil, tea camellia seed oil, rice bran oil, and cocoa butter; animal oils and fats, such as milk fat, beef tallow, lard, chicken fat, mutton tallow, and fish oil; hydrogenated oils and processed oils and fats prepared from any of these plant or animal oils and fats in liquid or solid form through oil and fat modification processes including purification, deodorization, separation, hydrogenation, and, transesterification, such as hydrogenated palm oil and hydrogenated palm kernel oil; and liquid oils and solid fats obtained by further separation of these oils and fats. In addition, physiologically active oils and fats may also be used, specifically including docosahexaenoic acid (DHA), eicosapentaenoic acid (EPA), arachidonic acid, α-linolenic acid, γ-linolenic acid, and medium chain fatty acid triglycerides (MCT) and preferably including medium chain fatty acid triglycerides (MCT). These oils and fats may be used individually or in combination as a mixture.

In particular, the edible oils and fats are preferred to have a ratio of preferably not more than 50% by mass, more preferably not more than 30% by mass, further preferably not more than 20% by mass, particularly preferably not more than 10% by mass, most preferably not more than 5% by mass, as the ratio of fatty acids other than saturated fatty acids, namely unsaturated fatty acids including trans fatty acids, in the total fatty acids bound to the triglyceride molecules, which are the main constituents of the edible oils and fats, to have a better taste.

Additionally, for the edible oils and fats, the ratio of fatty acids containing 12 or less carbon atoms in the total fatty acids bound to the triglyceride molecules is preferably not less than 30% by mass.

Additionally, the edible oils and fats are preferred to have an iodine value of typically not more than 60.0, preferably not more than 30.0, more preferably not more than 20.0, further preferably not more than 10.0, most preferably not more than 5.0, to prevent development of oxidized odor by heat and to have a better flavor.

Additionally, the edible oils and fats are preferred to a solid fat content (SFC) at 10° C. of typically not less than 0% by mass, preferably not less than 20% by mass, more preferably not less than 30% by mass, further more preferably not less than 40% by mass, most preferably not less than 50% by mass, to prepare a flavorful composition.

In this respect, a solid fat content (SFC) is generally measured by a method based on conventional pulse NMR technique, although using a solid fat index (SFI) determined by thermal analysis will make little difference to results.

Additionally, the edible oils and fats are preferred to have a slip melting point of typically −20° C. or higher, preferably −10° C. or higher, more preferably 10° C. or higher, further preferably 15° C. or higher, particularly preferably 20° C. or higher, most preferably 25° C. or higher, to prepare a flavorful composition. The edible oils and fats are preferred to have a maximum slip melting point of preferably 70° C. or lower, more preferably 60° C. or lower, further preferably 50° C. or lower, most preferably 45° C. or lower, to provide excellent emulsion stability.

The ratio of the oil phase component in the oil-in-water emulsion composition according to the third embodiment of the present invention is not limited to a particular ratio as long as it is a sufficient amount that enables production of an oil-in-water emulsion composition, and the ratio is typically not less than 5% by weight, preferably not less 10% by weight, more preferably not less than 20% by weight, further preferably not less than 30% by weight, particularly preferably not less than 50% by weight, and is typically not more than 95% by weight, preferably not more than 90% by weight, more preferably not more than 80% by weight, further preferably not more than 70% by weight, relative to the total weight of the composition. The oil-in-water emulsion composition according to the present embodiment can keep the structure of an oil-in-water emulsion even after diluted with water, and can consequently be used as a raw material for preparation of final products. Emulsion compositions containing a high content of an oil phase component (high internal phase emulsion compositions) can be reduced in weight and volume prior to transport, for example, as intermediates for producing final products, which advantageously increases transportation efficiency and consequently reduces overall production cost. Additionally, although a high oil phase content in an oil-in-water emulsion causes oil droplets to be in close proximity to each other, which generally promotes coalescence of oil droplets and destabilizes the oil-in-water emulsion, stability is maintained in the oil-in-water emulsion composition according to the present embodiment, due to the presence of the particular solid particles along the interface between the aqueous phase component and the oil phase component, even under a condition where oil droplets are in close proximity to each other.

The aqueous phase component contained in the oil-in-water emulsion composition according to the third embodiment of the present invention should be an aqueous phase component that is typically combined in emulsion compositions and forms an aqueous phase. In addition to water, lower alcohols, polyhydric alcohols, and the like may be contained.

The ratio of the aqueous phase component in the oil-in-water emulsion composition according to the third embodiment of the present invention is not limited to a particular ratio as long as it is a sufficient amount that enables production of an oil-in-water emulsion composition, and the ratio is typically not less than 20% by weight, preferably not less than 25% by weight, and is typically less than 95% by weight, preferably not more than 90% by weight, more preferably not more than 80% by weight, further preferably not more than 70% by weight, relative to the total weight of the composition.

The oil-in-water emulsion composition according to the third embodiment of the present invention has excellent stability without need of incorporation of a conventional surfactant. Thus, the content of a surfactant may be 0% by weight relative to the total weight of the composition, but a surfactant may be contained as necessary. Particularly in cases where a surfactant is contained in the oil-in-water emulsion composition, the surfactant is preferably used as a surface modifying substance for the solid particles. The surfactant type is not limited to a particular type, and examples of the surfactant include a low-molecular-weight surfactant which is a surface-active substance having amphipathic properties and a molecular weight as low as 5,000 or less. Polymers such as proteins, polysaccharides, and synthetic polymers are not included in the low-molecular-weight surfactant.

The low-molecular-weight surfactant may be in any form, such as powder, solid, liquid, or paste. Additionally, the molecular weight of the low-molecular-weight surfactant is preferably not more than 3,000, and more preferably not more than 2,000. The lower molecular weight of the low-molecular-weight surfactant is preferred because it leads to a larger number of moles per weight and a larger number of surfactant molecules that contribute to the reaction with the solid particles. The minimum molecular weight of the low-molecular-weight surfactant is not limited to a particular molecular weight, and the surfactant has a minimum molecular weight of not less than 200 due to the presence of hydrophilic and lipophilic moieties in the structure of the molecule.

Examples of the surfactant type include anionic surfactants, cationic surfactants, amphoteric surfactants, and nonionic surfactants.

In cases where a surfactant is used in food applications, the surfactant is preferably a food-grade surfactant that can be used in foods and beverages, and examples of the food-grade surfactant include sucrose fatty acid esters, glycerol fatty acid esters, polyglycerol fatty acid esters, sorbitan fatty acid esters, polyoxyethylene sorbitan fatty acid esters, propylene glycol fatty acid esters; lactylate esters of fatty acids such as calcium stearoyl lactylate and sodium stearoyl lactylate; fatty acid salts, such as sodium stearate and sodium oleate; enzymatically decomposed lecithin; and organic acid monoglycerides, such as acetic acid monoglycerides, citric acid monoglycerides, lactic acid monoglycerides, succinic acid monoglycerides, and diacyltartaric acid monoglycerides.

Specifically, polyglycerol fatty acid esters having a glycerol polymerization degree of not less than 4, preferably a glycerol polymerization degree of 4 to 12, such as decaglycerol myristic acid ester, decaglycerol palmitic acid ester, decaglycerol stearic acid ester, and decaglycerol oleic acid ester;

fatty acid diesters of glycerol, such as glycerol dimyristate, glycerol dipalmitate, glycerol distearate, and glycerol dioleate;

diglycerol fatty acid esters containing two or more alkyl groups, such as diglycerol myristic acid ester, diglycerol palmitic acid ester, diglycerol stearic acid ester, and diglycerol oleic acid ester;

triglycerol fatty acid esters, such as triglycerol myristic acid ester, triglycerol palmitic acid ester, triglycerol stearic acid ester, and triglycerol oleic acid ester;

organic acid esters of diglycerides, such as esters of succinic acid, citric acid, or diacetyltartaric acid and diglycerides of saturated or unsaturated $C_{12}$-$C_{22}$ fatty acids;

polyglycerol condensed ricinoleates, such as tetraglycerol ricinoleate;

sorbitan fatty acid esters, such as sorbitan myristic acid ester, sorbitan palmitic acid ester, sorbitan stearic acid ester, and sorbitan oleic acid ester;

propylene glycol fatty acid esters containing two or more alkyl groups, such as propylene glycol myristic acid ester, propylene glycol palmitic acid ester, propylene glycol stearic acid ester, and propylene glycol oleic acid ester;

sucrose fatty acid esters containing two or more alkyl groups, such as sucrose myristic acid ester, sucrose palmitic acid ester, sucrose stearic acid ester, and sucrose oleic acid ester; and phospholipid such as lecithin; enzyme-treated lecithin; glycolipid; and saponin.

Examples of commercially available products of the above-described sucrose fatty acid esters include "RYOTO Sugar ester S-1670," "RYOTO Sugar ester S-1570," "RYOTO Sugar ester S-1170," "RYOTO Sugar ester S-970," "RYOTO Sugar ester P-1670," "RYOTO Sugar ester P-1570," "RYOTO Sugar ester M-1695," "RYOTO Sugar ester O-1570," "RYOTO Sugar ester L-1695," "RYOTO Sugar ester LWA-1570," and "RYOTO Monoester P" (all of which are manufactured under the trade name RYOTO by Mitsubishi-Chemical Foods Corporation); and "DK ESTER SS," "DK ESTER F-160," "DK ESTER F-140," and "DK ESTER F-110" (all of which are manufactured under the trade name DK ESTER by DKS Co., Ltd.).

Among the above-described polyglycerol fatty acid esters, polyglycerol fatty acid esters having an average glycerol polymerization degree of 2 to 20 are preferred, and those having an average glycerol polymerization degree of 2 to 10 are more preferred.

Examples of commercial products of the polyglycerol fatty acid esters include "RYOTO Polyglycerol ester S-10D," "RYOTO Polyglycerol ester SWA-10D," "RYOTO Polyglycerol ester SWA-15D," "RYOTO Polyglycerol ester SWA-20D," "RYOTO Polyglycerol ester P-8D," "RYOTO Polyglycerol ester M-7D," "RYOTO Polyglycerol ester M-10D," "RYOTO Polyglycerol ester O-15D," "RYOTO Polyglycerol ester L-7D," and "RYOTO Polyglycerol ester L-10D" (all of which are manufactured under the trade name RYOTO by Mitsubishi-Chemical Foods Corporation); "SY-GLYSTER MSW-7S," "SY-GLYSTER MS-5S," "SY-GLYSTER MO-7S," "SY-GLYSTER MO-5S," "SY-GLYSTER ML-750," and "SY-GLYSTER ML-500" (all of which are manufactured under the trade name SY-GLYSTER by Sakamoto Yakuhin Kogyo Co., Ltd.); "Sunsoft Q-14F," "Sunsoft Q-12F," "Sunsoft Q-18S," "Sunsoft Q-182S," "Sunsoft Q-17S," "Sunsoft Q-14S," "Sunsoft Q-12S," "Sunsoft A-121C," "Sunsoft A-141C," "Sunsoft A-121E," "Sunsoft A-141E," "Sunsoft A-171E," and "Sunsoft A-181E" (all of which are manufactured under the trade name Sunsoft by Taiyo Kagaku Co., Ltd.); "POEM TRP-97RF," "POEM J-0021," "POEM J-0081HV," and "POEM J-0381V" (all of which are manufactured under the trade name POEM by Riken Vitamin Co., Ltd.); and "NIKKOL Hexaglyn 1-M," "NIKKOL Hexaglyn 1-L," "NIKKOL Decaglyn 1-SV," "NIKKOL Decaglyn 1-OV," "NIKKOL Decaglyn 1-M," and "NIKKOL Decaglyn 1-L" (all of which are manufactured under the trade name NIKKOL by Nikko Chemicals Co., Ltd.).

Examples of commercial products of the polyoxyethylene sorbitan fatty acid esters include "EMASOL S-120V," "EMASOL L-120V," "EMASOL O-120V," "RHEODOL TW-S120V," "RHEODOL TW-L120," "RHEODOL TW-O120V," "RHEODOL TW-L106," "RHEODOL TW-P120," "RHEODOL TW-O320V," "RHEODOL Super TW-L120," "RHEODOL 440V," and "RHEODOL 460V" (all of which are manufactured under the trade names of EMASOL and RHEODOL by Kao Corporation); "SOR- GEN TW-60F," "SORGEN TW-20F," and "SORGEN TW-80F" (all of which are manufactured under the trade name of SORGEN by DKS Co., Ltd.); "Admul T60K" and "Admul T80K" (all of which are manufactured under the trade name of Admul by Kerry Inc.); "T-Maz 60K" and "T-Maz 80K" (all of which are manufactured under the trade name of T-Maz by BASF SE); "WILSURF TF-60" and "WILSURF TF-80" (all of which are manufactured under the trade name of WILSURF by NOF Corporation); and "Glycosperse S-20K FG" and "Glycosperse O-20K FG" (all of which are manufactured under the trade name of Glycosperse by Lonza Group AG).

Among the above-described sucrose fatty acid esters and polyglycerol fatty acid esters, food-grade emulsifiers which have a bacteriostatic effect on heat-resistant bacteria (namely, bacteriostatic emulsifiers) may be used. Sucrose fatty acid esters and polyglycerol fatty acid esters, each having a $C_{14}$-$C_{22}$ alkyl group, are more preferred, and sucrose fatty acid esters and polyglycerol fatty acid esters, each containing a $C_{16}$-$C_{18}$ fatty acid, are further preferred, all of which exert a high bacteriostatic effect against heat-resistant bacteria and are thus suitable. The sucrose fatty acid esters and polyglycerol fatty acid esters that can be used contain a monoester(s) at a content of not less than 50% by mass, preferably not less than 60% by mass, further preferably not less than 70% by mass, which are highly effective against heat-resistant bacteria and are thus suitable. Among the polyglycerol fatty acid esters, polyglycerol fatty acid esters having an average polymerization degree of 2 to 5 in the polyglycerol moiety are preferred and, furthermore, polyglycerol fatty acid esters having an average polymerization degree of 2 to 3 are most preferred because of their high effectiveness against bacteria.

The ratio of the surfactant for use in the oil-in-water emulsion composition according to the third embodiment of the present invention is not limited to a particular ratio, and the ratio is typically more than 0% by weight, and is typically not more than 5% by weight, preferably not more than 1% by weight, more preferably not more than 0.1% by weight, further preferably not more than 0.05% by weight, particularly preferably not more than 0.01% by weight, most preferably not more than 0.005% by weight, relative to the total weight of the composition.

In the third embodiment of the present invention, the oil-in-water emulsion composition may contain the above-described solid particles, surfactant, oil phase component, and aqueous phase component, a sweetening agent, a stabilizing agent, a milk component, a protein, a flavoring agent, a coloring agent, a salt, an organic acid, and the like as necessary.

Examples of the sweetening agent include the following materials:
sugars: monosaccharides, such as glucose, fructose, xylose, sorbose, galactose, and isomerized glucose syrup; disaccharides, such as sucrose, maltose, lactose, isomerized lactose, and palatinose; oligosaccharides, such as fructo-oligosaccharides, malto-oligosaccharides, isomalto-oligosaccharides, galacto-oligosaccharides, coupling sugar, and palatinose;
sugar alcohol: monosaccharide alcohols, such as erythritol, sorbitol, xylitol, and mannitol; disaccharide alcohols, such as maltitol, isomaltitol, and lactitol; trisaccharide alcohols, such as maltotriitol, isomaltotriitol, and pinitol; tetrasaccharide alcohols or higher sugar alcohols, such as oligosaccharide alcohols; powder-reconstituted maltose syrup, and the like;

high intensity sweetening agents: aspartame, neotame, sucralose, stevia, and the like.

Examples of the stabilizing agent include galactomannan, xanthan gum, carrageenan, gum arabic, tamarind gum, gellan gum, glucomannan, and cellulose.

Examples of the milk component include liquid materials, such as cow milk, processed milk, skimmed milk, fresh cream, whey, butter milk, sweetened condensed milk, and sugar-free condensed milk; and powdered milk products, such as whole milk powder, skimmed milk powder, nutrient-modified milk powder, powdered cream, powdered whey, and butter milk powder. Butter milk and butter milk powder are particularly preferred. Butter milk is also referred to as butter serum and is the fluid remaining when cream is prepared by, for example, centrifugation of cow milk and the resulting cream is, for example, churned to remove the milk fat as butter; examples of the butter milk includes condensed butter milk in liquid form obtained by condensation of butter milk, and butter milk powder in powder form obtained by spray drying of condensed butter milk. These may be used individually or in combination of two or more. Although an additional step of fermentation by acid-generating bacteria or addition of an acid such as organic acid may be added to the process of separating cream or butter from cow milk, the above-described fermentation or addition of an acid is not performed on butter milk used in the present invention.

As the butter milk, commercial products such as "butter milk powder" manufactured by Yotsuba Milk Products Col, Ltd. can be used.

As described above, preferably no casein or β-lactoglobulin, which are highly allergenic, and further preferably no milk-derived proteins are contained as milk components in terms of removing allergens. Additionally, casein and β-lactoglobulin are preferably used after being hydrolyzed by, for example, an enzyme or acid to low-molecular-weight compounds which are too small to be allergenic.

The protein may be an animal protein or a plant protein. Examples of the animal protein can include egg-derived materials, such as egg yolk, egg white, whole egg, and proteins isolated therefrom, including ovalbumin, conalbumin, ovomucoid, and ovoglobulin; and cow milk-derived materials, such as milk serum proteins, casein and casein salts such as sodium caseinate, potassium caseinate, magnesium caseinate, and calcium caseinate, β-lactoglobulin, α-lactoalbumin, serumalbumin, and immunoglobulin. Examples of the plant protein can include soybean-derived materials, such as defatted soy flour, soybean protein concentrate, soybean protein isolate, soybean protein extract, and proteins isolated therefrom, including 7S globulin and 11S globulin.

As described above, preferably no casein or β-lactoglobulin, which are highly allergenic, and further preferably no milk-derived proteins are contained as cow milk-derived proteins in terms of removing allergens. Additionally, casein and β-lactoglobulin are preferably used after being hydrolyzed by, for example, an enzyme or acid to low-molecular-weight compounds which are too small to be allergenic.

Any flavoring agent may be used as the flavoring agent. Examples of the flavoring agent include vanilla flavoring agents, such as vanilla essence; and milk flavoring agents, such as milk flavor, and butter flavor. A milk flavoring agent is particularly preferred as the flavoring agent, and the milk flavoring agent is not limited to a particular flavoring agent as long as it is a flavor containing an aroma component of milk and a flavor component characteristic of milk. Although the milk flavoring agent may be a chemically synthesized flavoring agent or a flavoring agent prepared by extraction and purification from milk, or a mixture thereof, milk flavoring agents prepared from milk as a raw material are more preferred, and milk flavoring agents prepared by an enzymatic reaction on milk components are further preferred because of the ability to reproduce the flavor of natural milk. These may be used individually or in combination of two or more.

Any coloring agent may be used as the coloring agent. Examples of the coloring agent include cacao pigment, β-carotene, annatto pigment, red pepper pigment, turmeric pigment, oil red pigment, paprika pigment, naphthol yellow pigment, and riboflavin butyrate (VB2).

Examples of the salt include chlorides, such as sodium chloride, potassium chloride, and magnesium chloride; carbonate salts, such as sodium carbonate, potassium carbonate, and calcium carbonate; bicarbonate salts, such as sodium bicarbonate; phosphate salts, such as disodium hydrogen phosphate, trisodium phosphate, dipotassium hydrogen phosphate, and tripotassium phosphate; sodium polyphosphate; citrate salts, such as sodium citrate; and sodium lactate. Salts containing magnesium are particularly preferred as the salt, and examples of magnesium-containing salts that can be used in food applications include milk serum mineral, magnesium chloride, magnesium oxide, magnesium carbonate, magnesium sulfate, bittern (crude magnesium chloride from seawater), dolomite, unrefined salt, magnesium stearate, magnesium hydrogen phosphate, trimagnesium phosphate, magnesium silicate, magnesium hydroxide, magnesium acetate, magnesium citrate, magnesium malate, magnesium benzoate, magnesium gluconate, magnesium L-glutamate, sepiolite, talc, and phytin.

Examples of the organic acid include fumaric acid, succinic acid, citric acid, tartaric acid, diacetyltartaric acid, malic acid, adipic acid, glutaric acid, and maleic acid.

The oil-in-water emulsion composition according to the third embodiment of the present invention has an emulsion structure where the solid particles are distributed along the interface between the oil phase component and the aqueous phase component. Additionally, the oil-in-water emulsion composition preferably has an emulsion structure where the solid particles are distributed along the interface between a continuous phase and a discontinuous phase. The presence of such a structure allows an oil-in-water emulsion composition to have temperature drop resistance and heat resistance and to contain particles with a uniform particle size, regardless of before or after heating.

In the above-described structure of the oil-in-water emulsion composition, the size of discontinuous phase droplets, namely the diameter of oil phase droplets in an O/W emulsion or the diameter of oil phase droplets in a W/O/W emulsion, is preferably not less than 0.5 μm and not more than 1000 μm, more preferably not less than 0.7 μm and not more than 500 μm, further preferably not less than 1 μm and not more than 100 μm, particularly preferably not less than 1 μm and not more than 50 μm, in view of stability, food texture, and tactile impression. The diameter of oil phase droplets can be adjusted to a desired size by appropriately coordinating the agitation speed and the length of agitation time in the emulsification process for an emulsion composition.

Such an emulsion structure can be confirmed by polarization microscopy. Additionally, the size of oil phase droplets refers to the average major axis length of oil phase droplets that can be identified by polarization microscopy. Oil phase droplets to be identified may be 10 or more, 50 or more, 100 or more, or 200 or more in number.

In addition, a laser diffraction/scattering particle size analyzer or a measurement instrument for dynamic light scattering can be used to measure the size of oil phase droplets in the above-described oil-in-water emulsion composition, namely the particle size distribution, median diameter, and average particle size of oil phase droplets in the O/W emulsion.

The oil-in-water emulsion composition according to the third embodiment of the present invention preferably shows a small difference in the diameter of emulsion droplets, namely the diameter of the above-described discontinuous phase droplets, before and after heating at 121° C. For the change in the diameter before and after heating, the change in the median diameter (D50) of droplets in the oil-in-water emulsion composition after heating from the median diameter (D50) of droplets in the oil-in-water emulsion composition before heating may be calculated as ±30% or less, ±25% or less, or ±20% or less based on that the median diameter (D50) of droplets in the oil-in-water emulsion composition before heating is regarded as 100%.

The oil-in-water emulsion composition according to the third embodiment of the present invention may contain any active component, which can be expected to exert a desired physiological effect in biological bodies, in the oil phase or the solid particles. The presence of the active component enables production of functional foods excellent in stability. The forms of the functional foods can include, but are not limited to, retort-processed dietary supplement and liquid diet as well as commonly consumed foods, such as nutritional supplement drink, nutritional tonics, recreational beverages, and chilled sweets. Examples of the active component that can be expected to exert a physiological effect include fats, trace elements, vitamins, amino acids, minerals, and medicinal ingredients derived from any natural materials or synthetic compounds.

Additionally, at least one or more selected from a medium chain fatty acid, a pigment, and a flavor may be contained in the oil phase. Preferably, the presence of the above-described components in the oil phase potentially contributes to production of high energy foods and provides foods with an appetizing appearance or flavor. In that case, the ratio of at least one or more selected from a medium chain fatty acid, a pigment, and a flavor is preferably more than 0% by weight, more preferably not less than 1% by weight, further preferably not less 10% by weight, and is preferably not more than 90% by weight, more preferably not more than 80% by weight, relative to the total weight of the oil-in-water emulsion composition.

The emulsion structures in the first and second embodiments of the present invention can typically be prepared by either of the following methods:

a production method which comprises the step A1 of mixing an aqueous phase component with the above-described surfactant and solid particles, and agitating the resulting mixture, and the step A2 of mixing the mixture obtained in the prior step with the oil phase component and agitating the resulting mixture; or a production method which comprises the step A1' of mixing the oil phase component with the surfactant and the solid particles, and agitating the resulting mixture, and the step A2' of mixing the mixture obtained in the prior step with the aqueous phase component and agitating the resulting mixture.

The step A1 is a step of preparing an aqueous phase. Preparation of an aqueous phase by adding a combination of a particular surfactant and solid particles to the aqueous phase, as described above, promotes the interaction between the surfactant and the solid particles, which in turn promotes formation of emulsion structures of the present embodiments where the solid particles are distributed along the interface between the oil phase component and the aqueous phase component.

Additionally, the step A1' is a step of preparing an oil phase. Preparation of an oil phase by adding a combination of a particular surfactant and solid particles to the oil phase, as described above, promotes the interaction between the surfactant and the solid particles, which in turn promotes formation of emulsion structures of the present embodiments where the solid particles are distributed along the interface between the oil phase component and the aqueous phase component.

The mixtures in the steps A1 and A1' may be agitated under normal temperature and pressure, or agitated under warming and/or high pressure. In cases where the mixtures are agitated under normal temperature and pressure, the agitation speed should typically be not less than 10 rpm and not more than 20,000 rpm and the agitation time is typically 10 seconds or more and 60 minutes or less.

Examples of agitator include high-pressure emulsifier homogenizer, paddle mixer, homogenizer, ultrasonic homogenizer, colloid mill, kneader, inline mixer, static mixer, and onlator, and paddle mixer and homogenizer, by which sufficient agitation can be provided with low energy and low cost, are preferred.

The steps A2 and A2' each are a step of preparing an oil-in-water emulsion composition. The mixture in the step A2 is typically agitated under warming to allow an oily component to melt sufficiently, and the temperature is typically 10° C. or higher and 100° C. or lower, preferably 20° C. or higher and 90° C. or lower. Additionally, the agitation speed should typically be not less than 10 rpm and not more than 20,000 rpm and the agitation time is typically 10 seconds or more and 60 minutes or less.

In addition, the emulsion compositions in the first and second embodiments of the present invention can be appropriately prepared in accordance with ordinary methods of preparing emulsion compositions.

Additionally, the prepared oil-in-water emulsion compositions may later be sterilized at a temperature of typically 80° C. or higher, preferably 100° C. or higher, and typically 160° C. or lower, preferably 150° C. or lower for a period of typically 0.01 minutes or more, preferably 0.03 minutes or more, and typically 60 minutes or less, preferably 30 minutes or less. The sterilization method is not limited to a particular method, and examples of the sterilization method include UHT sterilization, retort sterilization, and ohmic heating sterilization. UHT sterilization can be performed by any known method, including direct heating processes, such as the steam injection technique where hot steam is blown directly onto a composition and the steam infusion technique where a composition is sprayed into and heated by steam, or indirect heating processes using surface heat exchangers such as plate-type or tube-type exchangers, and can be performed using, for example, a plate-type sterilization apparatus.

The emulsion structure in the third embodiment of the present invention can typically be prepared by any of the following methods:

a production method which comprises the step B1 of dispersing the solid particles in the aqueous phase component to obtain an aqueous phase, the step B2 of mixing the oil phase component with the aqueous phase obtained in the step B1 and agitating the resulting mixture; or a production method which comprises the step B1' of dispersing the solid particles in the oil phase component to obtain an oil phase, the step B2' of mixing the aqueous phase component with the oil phase obtained in the step B1' and agitating the resulting mixture; or a production method which comprises the step B1" of dispersing the solid particles in the aqueous phase component and the oil phase component to obtain an aqueous phase and an oil phase, the step B2" of mixing the aqueous and oil phases obtained in the step B1" and agitating the resulting mixture.

The step B1 is a step of preparing an aqueous phase. Preparation of an aqueous phase by preliminary addition of solid particles to the aqueous phase component in advance, as described above, promotes formation of an emulsion structure of the present embodiment where the solid particles are distributed along the interface between the oil phase component and the aqueous phase component.

Additionally, the step B1' is a step of preparing an oil phase. Preparation of an oil phase by addition of solid particles to the oil phase component, as described above, promotes formation of an emulsion structure of the present embodiment where the solid particles are distributed along the interface between the oil phase component and the aqueous phase component.

Additionally, the step B1" is a step of preparing aqueous and oil phases. Preparation of aqueous and oil phases by preliminary addition of solid particles to aqueous and oil phase components, as described above, promotes formation of an emulsion structure of the present embodiment where the solid particles are distributed along the interface between the oil phase component and the aqueous phase component.

The aqueous or oil phase component and the solid particles in the steps B1, B1', and B1" may be agitated (dispersed) under normal temperature and pressure, or agitated under warming and/or high pressure. In cases where the mixture is agitated under normal temperature and pressure, the agitation speed should typically be not less than 10 rpm and not more than 20,000 rpm, and the agitation time is typically 10 seconds or more and 60 minutes or less.

Examples of agitator include high-pressure emulsifier homogenizer, paddle mixer, homogenizer, ultrasonic homogenizer, colloid mill, kneader, inline mixer, static mixer, and onlator, and paddle mixer and homogenizer, by which sufficient agitation can be provided with low energy and low cost, are preferred.

The steps B2, B2', and B2" each are a step of preparing an oil-in-water emulsion composition. The mixtures in the steps B2, B2', and B2" may be agitated under normal temperature and pressure, or agitated under warming and/or high pressure. The agitation speed should typically be not less than 10 rpm and not more than 20,000 rpm and the agitation time is typically 10 seconds or more and 60 minutes or less.

In addition, the emulsion composition in the third embodiment of the present invention can be appropriately prepared in accordance with ordinary methods of preparing emulsion compositions.

Additionally, the prepared oil-in-water emulsion composition may later be sterilized at a temperature of typically 80° C. or higher, preferably 100° C. or higher, and typically 160° C. or lower, preferably 150° C. or lower for a period of typically 0.01 minutes or more, preferably 0.03 minutes or more, and typically 60 minutes or less, preferably 30 minutes or less. The sterilization method is not limited to a particular method, and examples of the sterilization method include UHT sterilization, retort sterilization, and ohmic heating sterilization. UHT sterilization can be performed by any known method, including direct heating processes, such as the steam injection technique where hot steam is blown directly onto a composition and the steam infusion technique where a composition is sprayed into and heated by steam, or indirect heating processes using surface heat exchangers such as plate-type or tube-type exchangers, and can be performed using, for example, a plate-type sterilization apparatus.

The food-grade oil-in-water emulsion compositions according to the first and second embodiments of the present invention have applications in foods and beverages, which include, for example, instant foods, such as instant noodle, cup noodle, and instant soup or stew; and fortified diet, liquid diet, high calorie diet, as well as foods such as beverages and liquid foods; retort-processed dietary supplements; functional foods such as liquid diet; wheat flour products such as bread and noodle; oil and fat processed products such as fat spread and flour paste; various types of sauce and soup, such as curry, pasta sauce, stew, demi-glace, white sauce, and tomato sauce; retort-processed foods and composite seasonings, such as seasoning mixtures for Chinese dishes and rice bowls; cakes and sweets, such as yogurt, cheese, ice cream, cream, caramel, candies, chewing gum, chocolate, cookies and biscuits, cakes, pies, snacks, crackers, Japanese sweets, rice cakes, sweet bean cakes jelly, and pudding; meat products, such as Hamburg steak, meatball, and canned seasoned meat; frozen foods, refrigerated foods; and cooked and semi-cooked dishes, such as packed daily dishes and in-store prepared daily dishes. Foods such as beverages and liquid foods are particularly preferred, and examples of the beverages include milk beverages, soup beverages, coffee beverages, cocoa-based beverages, tea beverages (such as black tea, green tea, and Chinese tea), bean- or cereal-based beverages, and acidic beverages, and preferably include milk beverages, coffee beverages, and tea beverages. Additionally, the food-grade oil-in-water emulsion compositions according to the present embodiments can be suitably used in, for example, packaged beverages, such as canned beverages, PET bottle beverages, carton beverages, and glass bottle beverages.

The oil-in-water emulsion composition according to the third embodiment of the present invention has applications in pharmaceutical products, cosmetics, and foods, and can be used in, for example, orally ingested products. For example, the products, applications, and features of the oil-in-water emulsion composition are not limited, as long as they are adequate for oral ingestion. The oil-in-water emulsion composition has specific applications in foods and beverages and in tube-feeding nutrients, which foods and beverages include, for example, instant foods, such as instant noodle, cup noodle, and instant soup or stew; and fortified diet, liquid diet, high calorie diet, as well as foods such as beverages and liquid foods; retort-processed dietary supplements; functional foods such as liquid diet; wheat flour products such as bread and noodle; oil and fat processed products such as fat spread and flour paste; various types of sauce and soup, such as curry, pasta sauce, stew, demi-glace, white sauce, and tomato sauce; retort-processed foods and composite seasonings, such as seasoning mixtures for Chinese dishes and rice bowls; cakes and sweets, such as yogurt, cheese, ice cream, cream, caramel, candies, chewing gum, chocolate, cookies and biscuits, cakes, pies, snacks, crackers, Japanese sweets, rice cakes, sweet bean cakes jelly, and pudding; meat products, such as Hamburg steak, meatball, and canned seasoned meat; frozen foods, refrigerated foods; and cooked and semi-cooked dishes, such as packed daily dishes and in-store prepared daily dishes. Foods such as beverages and liquid foods are particularly preferred, and examples of the beverages include milk beverages, soup beverages, coffee beverages, cocoa-based beverages, tea beverages (such as black tea, green tea, and Chinese tea), bean- or cereal-based beverages, and acidic beverages, and preferably include milk beverages, coffee beverages, and tea beverages. Additionally, the food-grade oil-in-water emulsion composition according to the present embodiment can be suitably used in, for example, packaged beverages, such as canned beverages, PET bottle beverages, carton beverages, and glass bottle beverages.

EXAMPLES

Examples A

<Preparation of Oil-in-Water Emulsion Compositions>
(Oil-in-Water Emulsion Composition A)

In a container, 3.007 g of silica particles (SANSIL SS-07; manufactured by Tokuyama Corporation) as solid particles and 12.008 g of an aqueous solution previously added with hexadecyltrimethylammonium bromide (CTAB; manufactured by Wako Pure Chemical Industries, Ltd.) were placed and then processed with a homogenizer (IKA T25 digital ULTRA TURRAX) at 9,000 rpm for 2 minutes to obtain an aqueous phase. The used aqueous CTAB solution ($1.9 \times 10^{-4}$ mol/L) was prepared in advance by mixing and stirring 0.0049 g of CTAB and 70.082 g of desalted water.

In a container, 10.509 g of the aqueous phase and 4.497 g of heated hydrogenated coconuts oil at 60° C. were placed and further heated to 60° C., and then agitated using a homogenizer at 17,000 rpm for 2 minutes to obtain the oil-in-water emulsion composition A.

(Oil-in-Water Emulsion Composition B)

In a container, 0.920 g of hydrophilic silica particles (OX50; manufactured by Nippon Aerosil Co., Ltd.) as solid particles and 23.1 g of an aqueous solution with CTAB were placed and then processed with a homogenizer at 9,000 rpm for 1 minute to obtain an aqueous phase. The CTAB concentration in the used aqueous CTAB solution was $1.9 \times 10^{-4}$ mol/L. After the thus prepared aqueous phase was warmed to 60° C., 6 g of preheated hydrogenated coconuts oil at 60° C. was added portionwise to the aqueous phase over 2 minutes with agitation with a homogenizer at 9,000 rpm, and the resulting mixture was further processed with the homogenizer at 9,000 rpm for 1 minute. Furthermore, the speed of rotation was reduced to 3,000 rpm and the mixture was processed for another 10 minutes to obtain the oil-in-water emulsion composition B.

(Oil-in-Water Emulsion Composition C)

The oil-in-water emulsion composition C was obtained in the same manner as the oil-in-water emulsion composition A, except that 12.006 g of desalted water and 2.978 g of silica particles (SANSIL SS-07; manufactured by Tokuyama Corporation) were used and processed with a homogenizer at 17,000 rpm for 2 minutes to prepare an aqueous phase without addition of a surfactant.

(Oil-in-Water Emulsion Composition D)

The oil-in-water emulsion composition D was obtained in the same manner as the oil-in-water emulsion composition B, except that 23.172 g of hydrophilic silica particles (OX50; manufactured by Nippon Aerosil Co., Ltd.) and 23.1719 g of desalted water were used to prepare an aqueous phase without addition of a surfactant.

(Oil-in-Water Emulsion Composition E)

The oil-in-water emulsion composition E was obtained in the same manner as the oil-in-water emulsion composition B, except that an aqueous phase was prepared using the aqueous CTAB solution but not adding the silica particles.

(Composition F)

Once an oil-in-water emulsion composition was prepared in the same manner as the oil-in-water emulsion composition A, except that the oil-in-water emulsion composition A was cooled down to normal temperature and an aqueous CTAB solution was added to a final CTAB concentration of 0.030% by weight, aggregates were formed in the resulting emulsion composition.

Microscopic observation confirmed that the aggregation of emulsion droplets was resulting from the addition of CTAB to a concentration equal to or above the critical micelle concentration (CMC). Such aggregates of oil droplets in an emulsion composition are highly likely to lead to coalescence of oil droplets or oil phase separation when heating or a cycle of temperature rise and drop is repeated, suggesting poor emulsion stability of the composition.

(Oil-in-Water Emulsion Composition G)

The oil-in-water emulsion composition G was prepared in the same manner as the oil-in-water emulsion composition A, except that refined palm oil was used instead of hydrogenated coconuts oil.

(Oil-in-Water Emulsion Composition H)

The oil-in-water emulsion composition H was prepared in the same manner as the oil-in-water emulsion composition C, except that refined palm oil was used instead of hydrogenated coconuts oil.

(Oil-in-Water Emulsion Composition I)

The oil-in-water emulsion composition I was prepared in the same manner as the oil-in-water emulsion composition E, except that refined palm oil was used instead of hydrogenated coconuts oil.

(Oil-in-Water Emulsion Composition J)

Sucrose fatty acid ester S-570 (manufactured by Mitsubishi-Chemical Foods Corporation) was used as a surfactant. First, S-570 was added to water and dissolved with warming in advance to prepare an aqueous phase. Next, heated refined palm oil at 60° C. was introduced into the aqueous phase with warming at 60° C. and agitation at 8,000 rpm using a homomixer manufactured by PRIMIX Corporation and then agitated at 10,000 rpm for further 10 minutes. The mixture was composed of 0.7% by weight of S-570 and 30% by weight of hydrogenated coconuts oil.

Furthermore, the mixture was placed and sterilized in a water bath at 60° C. for 1 hour and then placed in another water bath at normal temperature for cooling down, and the oil-in-water emulsion composition J was thereby obtained.

The components of the oil-in-water emulsion compositions A to I and the results of the below-described measurements are shown in Table 1.

<Measurement of the Size of Solid Particles Dispersed in a Liquid>

Water and silica particles were provided for a mixture having a solid particle concentration of 20% by weight and stirred with a homogenizer at 17,000 rpm for 2 minutes to obtain a silica particle dispersion. SANSIL SS-07 (manufactured by Tokuyama Corporation) or OX50 (manufactured by Nippon Aerosil Co., Ltd.) silica particles were used as the solid particles. For measuring the silica particles dispersed in water, particle size distribution measurement was performed on the silica particle dispersion as a sample by a flow method using an LA-920 laser diffraction/scattering particle size analyzer manufactured by Horiba, Ltd. A relative refractive index of 1.10 was used for the measurement, and the measurement results obtained by conversion from volume measurements are shown in Table 1.

TABLE 1

| | Oil-in-Water emulsion compositions A and G | Oil-in-Water emulsion composition B | Oil-in-Water emulsion compositions C and H | Oil-in-Water emulsion composition D | Oil-in-Water emulsion compositions E and I | Composition F |
|---|---|---|---|---|---|---|
| Solid particles | Silica particles SS-07 | Hydrophilic silica particles OX50 | Silica particles SS-07 | Hydrophilic silica particles OX50 | — | Silica particles SS-07 |
| Surfactant | CTAB | CTAB | — | — | CTAB | CTAB |
| HLB of the surfactant | 10 | 10 | — | — | 10 | 10 |
| Critical micelle concentration of the surfactant (mol/L) | $9 \times 10^{-4}$ | $9 \times 10^{-4}$ | — | — | $9 \times 10^{-4}$ | $9 \times 10^{-4}$ |
| Concentration (% by weight) of the surfactant in each oil-in-water emulsion composition | 0.0039 | 0.0054 | — | — | 0.0057 | 0.030 |
| Content (parts by weight) of the surfactant relative to 100 parts by weight of the solid particles | 0.028 (0.076 meq) | 0.16 (0.45 meq) | — | — | — | 0.21 (0.58 meq) |
| Average particle size or primary particle size of the solid particles (μm) | 0.7 | 0.04 | 0.7 | 0.04 | — | 0.7 |

* catalog value

TABLE 1-continued

|  | Oil-in-Water emulsion compositions A and G | Oil-in-Water emulsion composition B | Oil-in-Water emulsion compositions C and H | Oil-in-Water emulsion composition D | Oil-in-Water emulsion compositions E and I | Composition F |
|---|---|---|---|---|---|---|
| Specific surface area of the solid particles (m²/g) * catalog value | 4 | 50 ± 15 | 4 | 50 ± 15 | — | 4 |
| Average particle size of the solid particles in water (μm) | 0.726 | 0.224 | 0.726 | 0.224 | — | 0.726 |

<Evaluation of High Temperature Stability of Oil-in-Water Emulsion Compositions>

Example A1

The oil-in-water emulsion composition A was observed at 60° C. using an ECLIPSE LV 100N POL polarization microscope manufactured by Nikon Corporation and the NIS-Elements ver.3.2 imaging software manufactured by Nikon Corporation, and a TH-600PM cooling/heating device for microscopes manufactured by Linkam Scientific Instruments. The presence of silica particles on the surfaces of emulsion droplets was able to be detected. Therefore, it was indicated that the preparation of an aqueous phase by adding a combination of the surfactant and the silica particles caused the resulting oil-in-water emulsion composition to have a structure where the particles were distributed along the interface between the aqueous and oil phases.

Comparative Example A1

When the oil-in-water emulsion composition C was observed by polarization microscopy under the same conditions as those in Example A1, the presence of silica particles on the surfaces of emulsion droplets was not able to be detected. Thus, it was indicated that a structure where particles were distributed along the interface between aqueous and oil phases was not formed in an emulsion composition prepared using silica particles alone.

Example A2

After keeping the oil-in-water emulsion composition B in a water bath at 60° C. for 1 hour, no oil phase separation in the oil-in-water emulsion composition was observed. The result is shown in Table 2.

Comparative Example A2

After keeping the oil-in-water emulsion composition D at 60° C. for 1 hour, separation of the oil phase in the oil-in-water composition was observed. The result is shown in Table 2.

Comparative Example A3

After keeping the oil-in-water emulsion composition E at 60° C. for 1 hour, separation of the oil phase in the oil-in-water composition was observed. The result is shown in Table 2.

Example A2'

After keeping the oil-in-water emulsion composition G in a water bath at 60° C. for 1 hour, no oil phase separation in the oil-in-water emulsion composition was observed. The result is shown in Table 2.

Comparative Example A2'

After keeping the oil-in-water emulsion composition H at 60° C. for 1 hour, separation of the oil phase in the oil-in-water composition was observed. The result is shown in Table 2.

Comparative Example A3'

After keeping the oil-in-water emulsion composition I at 60° C. for 1 hour, separation of the oil phase in the oil-in-water composition was observed. The result is shown in Table 2.

TABLE 2

|  |  | Example A2 | Comparative Example A2 | Comparative Example A3 | Example A2' | Comparative Example A2' | Comparative Example A3' |
|---|---|---|---|---|---|---|---|
| Length of time after emulsification | 0 hours | ○ | ○ | ○ | ○ | ○ | ○ |
|  | 1 hour | ○ | x | x | ○ | x | x |

○: absence of oil phase separation;
x: presence of oil phase separation.

As apparent from the results shown in Table 2, the oil-in-water emulsion composition B, which contained an aqueous phase prepared by adding a combination of a surfactant and silica particles, showed no oil phase separation even after being kept at a high temperature for 1 hour and was able to retain stable emulsified conditions. On the other hand, the oil-in-water emulsion compositions D and E to which a combination of a surfactant and silica particles was not added showed separation of the oil phases, which indicated poor emulsion stability of the oil-in-water emulsion compositions.

<Evaluation of Temperature Drop Stability of Oil-in-Water Emulsion Compositions>

Example A3

In a container heated at 60° C., 3 ml of the oil-in-water emulsion composition A heated at 60° C. was placed, and the container was placed in a water bath to cool the resulting mixture to room temperature. Subsequently, the container was shaken by inversion to identify the presence or absence of fluidity in the oil-in-water emulsion composition A by visual observation. The result is shown in Table 3, in which the presence of fluidity is indicated by a circle and the absence of fluidity is indicated by an x-mark.

Example A3'

The evaluation was performed in the same manner as in Example A3, except that the oil-in-water emulsion composition G was used. The result is shown in Table 3.

Comparative Example A4

Evaluation of the Temperature Drop Stability of an Emulsion

The evaluation was performed in the same manner as in Example A3, except that the oil-in-water emulsion composition C was used. The result is shown in Table 3.

TABLE 3

| | | Example A3 | Example A3' | Comparative Example A4 |
|---|---|---|---|---|
| Temperature of an emulsion | 60° C. | ○ | ○ | ○ |
| | Room temperature | ○ | ○ | x |

As apparent from the results shown in Table 3, the oil-in-water emulsion compositions A and G, which each contained an aqueous phase prepared by adding a combination of a surfactant and silica particles, were able to flow even after temperature drop and were able to retain stable emulsified conditions. The oil-in-water emulsion composition G was observed by polarization microscopy to measure the diameters of 40 emulsion droplets, and the mean diameter was found to be 21.64 μm.

Figure 2:
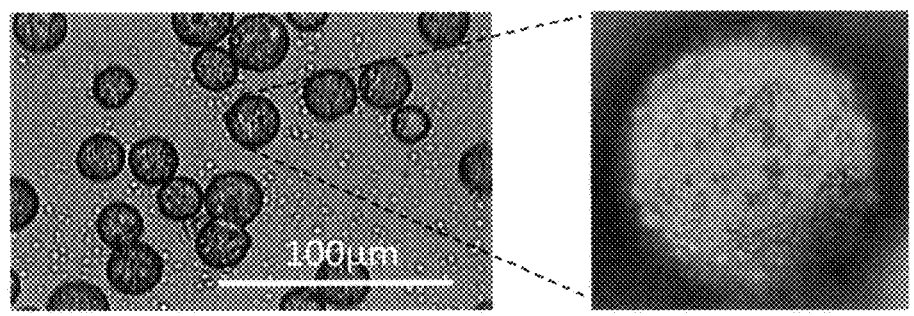
FIG. 2 shows a polarization micrograph (a picture as a substitute for a diagram) of the oil-in-water emulsion composition A diluted 10 times with water.
Figure 3:
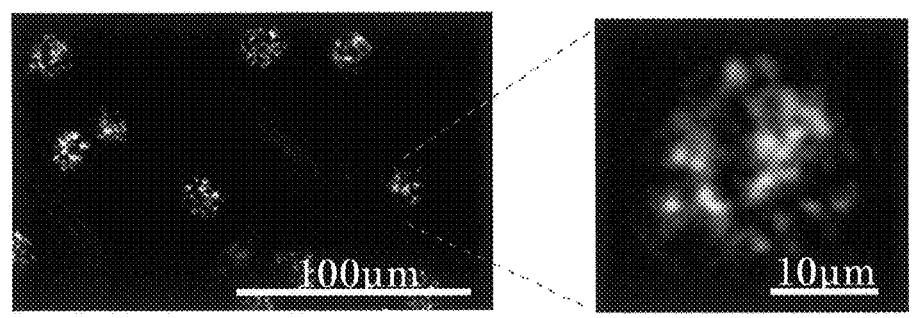
FIG. 3 shows a polarization micrograph (a picture as a substitute for a diagram) of the oil-in-water emulsion composition A in the extinction position.

Additionally, when the oil-in-water emulsion composition A was cooled down to room temperature and observed by polarization microscopy, the presence of silica particles on the surfaces of emulsion droplets was able to be detected (FIG. 1). Furthermore, the presence of silica particles on the surfaces of emulsion droplets (the interface between the aqueous and oil phases) was also able to be detected by microscopy even after the emulsion composition was diluted 10 times with water, which indicated the dilution stability of the composition (FIG. 2). The particle diameter was measured for 40 solid particles adsorbed to the interface between the aqueous and oil phases, and the mean diameter and the standard deviation were found to be 0.67 μm and 0.11, respectively. When the emulsion composition was observed in the extinction position using a polarization microscope, bright spots were observed in droplets of the internal phase of the emulsion, which indicated the crystallization of the hydrogenated coconuts oil in the internal phase of the emulsion and the absence of needle-like crystals protruded from the droplets (FIG. 3).

Therefore, it was indicated that the preparation of an aqueous phase by adding a combination of the surfactant and the silica particles caused the resulting oil-in-water emulsion composition to have a structure where the solid particles were distributed along the interface between the aqueous and oil phases even after temperature drop, regardless of whether the emulsion composition was diluted or not.

The oil-in-water emulsion compositions A and B were able to flow even after being cooled down to room temperature and were able to retain stable emulsified conditions.

On the other hand, the oil-in-water emulsion composition C to which neither a surfactant nor silica particles was not added lost its fluidity after temperature drop, which indicated that the oil-in-water emulsion composition was not able to retain stable emulsified conditions.

<Evaluation of Heat Resistance>

Example A4

Figure 4:
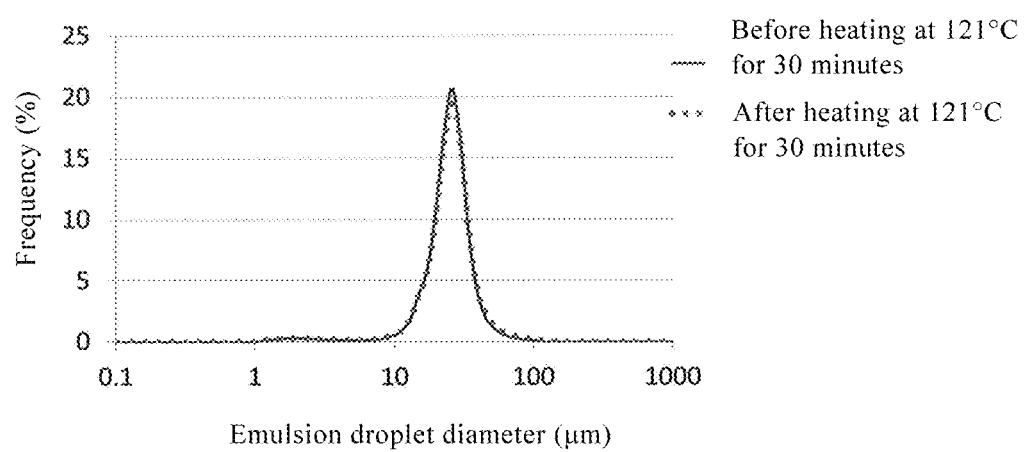
FIG. 4 shows a graph showing particle size distributions before and after heating measured in Example 4.

One ml of the oil-in-water emulsion composition A was transferred to a microtube, and the microtube was placed in a water bath to cool down the oil-in-water emulsion composition. The cap of the microtube was opened and the resulting opening of the microtube was covered with aluminium foil, after which the microtube was heated at 121° C. for 30 minutes in a BS-325 autoclave manufactured by Tomy Seiko Co., Ltd. After autoclaving, the microtube was removed from the autoclave after the temperature inside the autoclave was confirmed to be at a temperature of 80° C. or lower, and then placed in a water bath to cool down the oil-in-water emulsion composition. Particle size distribution measurement was performed on the oil-in-water emulsion composition A before and after heating at 121° C. by a flow method using an LA-920 laser diffraction/scattering particle size analyzer manufactured by Horiba, Ltd. A relative refractive index of 1.30 was used for the measurement, and the measurement result obtained by conversion from volume measurements is shown in FIG. 4 and Table 4. As seen in FIG. 4, no change in particle size distribution between before and after heating at 121° C. was detected. This indicated that preparation of an aqueous phase using a combination of a surfactant and silica particles would provide enough heat resistance to withstand heat sterilization.

TABLE 4

| | Mean diameter of emulsion droplets | Median diameter of emulsion droplets |
|---|---|---|
| Before heating | 24.2 (μm) | 23.6 (μm) |
| After heating | 24.9 (μm) | 23.8 (μm) |
| Change in diameter before and after heating | 2.9 (%) | 0.8 (%) |

<Evaluation of Deterioration of Edible Oils>

The oil-in-water emulsion composition G' having the same composition as the composition G was prepared using a homomixer manufactured by PRIMIX Corporation. A preheated oil phase was introduced into an aqueous phase with warming at 60° C. and agitation at 8,000 rpm. The mixture was further agitated at 10,000 rpm for 10 minutes and heated at 60° C. for 1 hour, and then cooled down to room temperature to obtain the oil-in-water emulsion composition G'. The oil-in-water emulsion compositions G' and J were compared for the degree of oil deterioration. The oil deterioration was evaluated by analyzing the oils extracted from those oil-in-water emulsion compositions for peroxide value (acetic acid-chloroform method) and carbonyl value (The JOCS Standard Methods for the Analysis of Fats, Oils and Related Materials, Japan Oil Chemist's Society, ed.; the value of absorbance (at a wavelength of 440 nm) per 1 g of extracted oil [without peroxide decomposition]). The measurement results from samples stored at a temperature of 15° C. or higher for 0 days after the emulsification (hereinafter referred to as the test group "0 days"), samples stored at a temperature of 15° C. or higher for 15 days after the emulsification (hereinafter referred to as the test group "15 days"), and samples stored in an incubator at 15° C. for 25 days after the emulsification and then further stored in an oven at 40° C. for 4 days (hereinafter referred to as the test group "29 days") are shown in Table 5. Those samples were stored in a refrigerator at 4° C. until analysis.

Additionally, the amount of oxidation products in each extracted oil is shown in Table 5, and the ratio of oxidation products between the oil-in-water emulsion compositions G' and J is shown in Table 6, where the amount of oxidation products is a rough estimate of total products resulting from oxidation and is a sum of a peroxide value in mmol/kg, which is converted from a value in meq/kg by assuming the valence of each peroxide to be 1, and a corresponding carbonyl value in mmol/kg, which is converted from a value in μmol/g.

TABLE 5

| | Oil-in-water emulsion composition G' | | | Oil-in-water emulsion composition J | | |
|---|---|---|---|---|---|---|
| Test group | Peroxide value of the extracted oil (meq/kg) | Carbonyl value of the extracted oil (μmol/g) | Amount of oxidation products in the extracted oil (mmol/kg) | Peroxide value of the extracted oil (meq/kg) | Carbonyl value of the extracted oil (μmol/g) | Amount of oxidation products in the extracted oil (mmol/kg) |
| 0 days | 3.0 | 2.0 | 5.0 | 3.8 | 2.2 | 6.0 |
| 15 days | 4.4 | 2.0 | 6.4 | 4.9 | 3.2 | 8.1 |
| 29 days | 7.5 | 2.2 | 9.7 | 9.5 | 3.2 | 12.7 |

TABLE 6

| Test group | Amount of oxidation products in the oil extracted from the oil-in-water emulsion composition J/amount of oxidation products in the oil extracted from the oil-in-water emulsion composition G' |
|---|---|
| 0 days | 1.20 |
| 15 days | 1.27 |
| 29 days | 1.31 |

Tables 5 and 6 indicated that oxidative deterioration of the refined palm oil as an edible oil during the emulsification process and during the storage of each emulsion composition after emulsification, which generates odor, was prevented from proceeding in the oil-in-water emulsion composition G' prepared using a combination of a surfactant and solid particles, rather than in the oil-in-water emulsion composition J prepared using a commonly used emulsifier in the food field.

Additionally, visually detectable aggregates were generated in the oil-in-water emulsion composition J during the storage. Thus, it was indicated that the oil-in-water emulsion composition G' prepared using a combination of a surfactant and solid particles is more excellent in terms of storage stability of an oil-in-water emulsion composition.

Examples B

The methods used in Examples to measure physical properties are as follows.

<Measurement of the Contact Angle of an Aqueous or Oil Phase Component to Solid Particles>

Solid particles were compressed into a tablet, and an aqueous or oil phase component (Sukore 64G manufactured by Nisshin OilliO Group, Ltd. or hydrogenated coconuts oil) was dropped by gravity to the resulting tablet, and the contact angle was measured over time. For the purpose of minimizing the influence of liquid absorption into the rough or porous surface of the tablet, a set of measured contact angle values where the set of measured values that satisfied a nearly linear relationship between the change in contact angle and the amount of time (t) since the drop touched the surface of the tablet was fit to a linear model and the linear model was used to calculate the contact angle at the time of the touch event (t=0), which was determined as the contact angle of the aqueous or oil phase component to the solid particles.

Compression of solid particles into tablets (tablet formation) was performed using a tablet press (maximum tablet diameter: 20 mm). Solid particles were introduced into an internal cylinder of a tablet press, pressed with 5 tons of pressure, then exposed to reduced pressure by means of a vacuum pump, and subsequently pressed stepwise with 8 and 10 tons of pressure for tablet compression. When silica particles are used as the solid particles, 0.5 g of silica particles was used for the preparation of samples to measure the contact angle. When particles of starch (from corn), α-cyclodextrin, or β-cyclodextrin was used as the solid particles, 0.23 g of starch (from corn), α-cyclodextrin, or β-cyclodextrin was used for the preparation of samples to measure the contact angle. The amount was determined in consideration of the specific gravity of each type of solid particles, in such a manner that the volume of the added solid particles was equal to that of the used silica particles.

The contact angle was measured using an FTA instrument (First Ten Angstroms Inc., USA). In cases where the contact angle of an aqueous phase component was measured, about 12 to 13 μL of an aqueous phase component (specifically, water) as a constituent of an oil-in-water emulsion composition was dropped by gravity to a tablet formed as described above, and the contact angle was measured over time since the touch of the drop. In cases where the contact angle of an oil phase component was measured, about 3 to 4 µL of an oil phase component (specifically, medium chain fatty acid triglyceride (MCT) or hydrogenated coconuts oil) as a constituent of an oil-in-water emulsion composition was dropped by gravity for the measurement.

Furthermore, in cases where the contact angle of an oil phase component was measured for an emulsion containing an oil which was solid at normal temperature (specifically, hydrogenated palm oil), the emulsion was preheated to a temperature of 60° C. or higher to melt the oil and then used in a liquidized form for the measurement, as well as a tablet was heated to a temperature of 55° C. to 60° C. on a hotplate to avoid solidification of a drop of the oil phase component upon contact of the drop with the tablet. Additionally, also in cases where the contact angle of an aqueous phase component was measured for the emulsion, the emulsion containing the aqueous phase component (specifically, water) preheated to a temperature of 60° C. or higher was used for the measurement, as well as the tablet was heated to a temperature of 55° C. to 60° C. on a hotplate. Such measurement under heating was performed specifically in Examples B7, B8 and B9.

The measurement of contact angle was performed in an environment at a temperature of 23° C. and a humidity of 32 to 40%. The measurement results are shown in Table 7.

<SEM Observation of Solid Particles>

Figure 5:
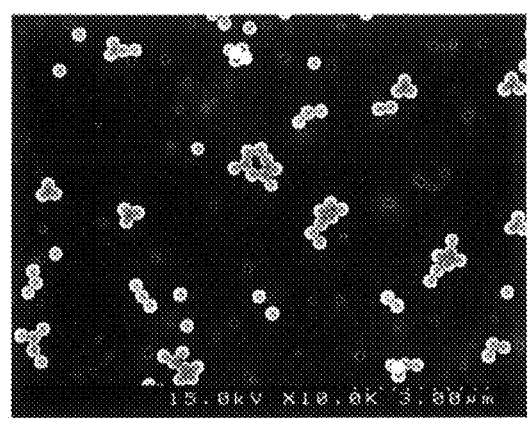
FIG. 5 shows an SEM image (a picture as a substitute for a diagram) of SANSIL SS-03 solid particles used in Examples.
Figure 6:
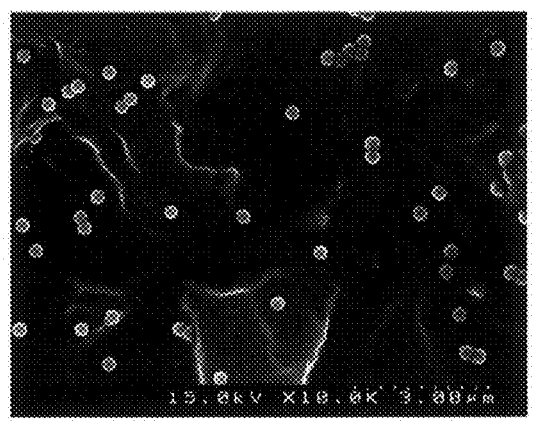
FIG. 6 shows an SEM image (a picture as a substitute for a diagram) of hydrophobized SANSIL SS-03 solid particles used in Examples.
Figure 7:
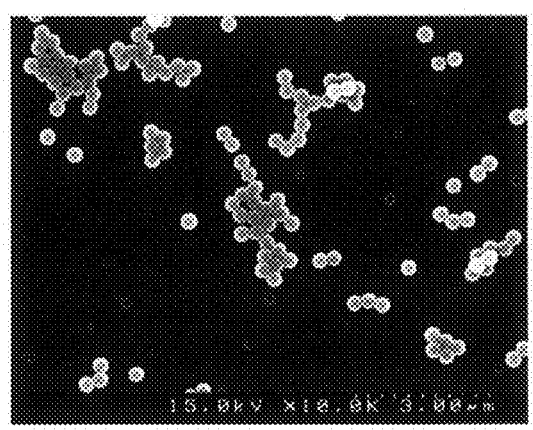
FIG. 7 shows an SEM image (a picture as a substitute for a diagram) of SANSIL SSP-03M solid particles used in Examples.

Observation of the morphology of particles with differences in surface properties was performed on SANSIL SS-03 silica particles, SSP-03M silica particles (manufactured by Tokuyama Corporation), and hydrophobized silica particles (hydrophobized SS-03) by the following procedure. Silica particles of each type were added to isopropyl alcohol to a concentration of 0.1% by weight, and the resulting mixture was stirred with a homogenizer at 17,000 rpm for 2 to 4 minutes, at 2,000 rpm for 2 minutes, and at 24,000 rpm for 6 minutes to obtain a silica particle dispersion. To an excised membrane filter (Advantec polycarbonate-type membrane filter; pore size: 0.1 µm Advantec Toyo Kaisha, Ltd.) which was adhered in advance to the stage of SEM, 5 µl of the aforementioned silica particle dispersion was dropped and the isopropyl alcohol was air-dried. An Au—Pd alloy was used in particles for vapor deposition, and the deposition was performed for 2 minutes. SEM observation was performed using an accelerating voltage of 15 kV. An observation image of SS-03 is shown in FIG. 5, and an observation image of hydrophobized SS-03 is shown in FIG. 6, and an observation image of SSP-03M is shown in FIG. 7.

<Measurement of the Average Particle Size of Solid Particles Dispersed in a Liquid>

Water and silica particles were provided for a mixture having a solid particle concentration of 20% by weight and stirred with a homogenizer at 17,000 rpm for 2 minutes to obtain a silica particle dispersion. Any silica particles selected from SANSIL SS-03, SS-07 (manufactured by Tokuyama Corporation), hydrophobized SS-03, and hydrophobized OX50 (manufactured by Nippon Aerosil Co., Ltd.) silica particles were used as the solid particles. For measuring the silica particles dispersed in water, particle size distribution measurement was performed on the silica particle dispersion as a sample by a flow method using an LA-920 laser diffraction/scattering particle size analyzer manufactured by Horiba, Ltd. The results obtained by conversion from volume measurements (the average particle size and median diameter of solid particles of each type in water) are shown in Table 7.

Additionally, when α-cyclodextrin or β-cyclodextrin particles were used as the solid particles, it was difficult to measure the particle size distribution in an aqueous dispersion containing particles at a concentration of 4% by weight on a laser diffraction/scattering particle size analyzer because of insufficient intensity of scattered light, and an FPAR-1000 analyzer manufactured by Otsuka Electronics Co., Ltd. (dynamic light scattering) with a measurement probe for dilute solutions was consequently used for the measurement. The measurement on α-cyclodextrin was performed at a temperature setting of 20° C., while the measurement on β-cyclodextrin was performed at a temperature setting of 60° C. The results are shown in Table 7. The obtained data was analyzed by cumulant analysis.

<Measurement of the L Values of Solid Particles>

Solid particles were filled in a sample cell and then the L value was measured using a spectrophotometer SE-2000 manufactured by Nippon Denshoku Industries Co., Ltd.

<Preparation of Oil-in-Water Emulsion Compositions>

The emulsion compositions K to N and Q to S, S', U, and W were prepared as Examples B1 to B10 by the following methods, and the emulsion type of each emulsion composition was determined by placing a drop of the emulsion composition on an aqueous or oil phase component and observing whether the drop spread on the aqueous phase or alternatively on the oil phase. Additionally, the emulsion compositions O, P, and T were prepared as Comparative Examples B1 to B3, similarly and the emulsion type of each emulsion composition was similarly determined. The results are shown in Table 7. As seen in Table 7, the emulsion composition O prepared using solid particles which formed a contact angle of 135 degrees with an aqueous phase component failed to be established as an oil-in-water emulsion composition.

In the emulsion compositions, water was used as an aqueous phase component and Sukore 64G (medium chain fatty acid triglyceride (MCT); manufactured by Nisshin OilliO Group, Ltd.) was used as an oil phase component.

(Emulsion Composition K)

Silica particles (SANSIL SS-03; manufactured by Tokuyama Corporation; average particle size: 0.3 µm) were used as the solid particles. In a container, 3.0 parts by weight of the silica particles and 12 parts by weight of water as an aqueous phase component were placed so that the content of the silica particles was 20% by weight, and the resulting mixture was processed using a homogenizer (IKA T25 digital ULTRA TURRAX) at 17,000 rpm for 2 minutes to obtain an aqueous phase. Sukore 64G (manufactured by Nisshin OilliO Group, Ltd.) was used as a sole oil phase component in an oil phase. In a container, 10.5 parts by weight of the aqueous phase and 4.5 parts by weight of the oil phase component were placed so that the content of the oil phase component was 30% by weight, and the resulting mixture was agitated using a homogenizer at 17,000 rpm for 2 minutes to obtain the emulsion composition K.

(Emulsion Composition L)

The emulsion composition L was obtained in the same manner as the emulsion composition K, except that hydrophobized silica particles were used as the solid particles.

The hydrophobized silica particles were obtained by the following method.

Ten parts by weight of silica particles (SANSIL SS-03; manufactured by Tokuyama Corporation; average particle size: 0.3 µm) and 198.5 parts by weight of water adjusted to pH 4.2 were placed in a container and stirred with a homogenizer at 17,000 rpm for 5 minutes. To the mixture, 0.21 parts by weight of trimethoxy(methyl)silane were added, and the resulting mixture was stirred with a stirrer around for 5 to 10 minutes. Subsequently, the mixture was stirred at 80° C. for 2 hours and 15 minutes. The mixture was warmed at 70° C. and concentrated with an evaporator to remove water, and then dried in an oven by heating at 120° C. for 3 hours and 25 minutes. Then, the dried material was ground in a mortar to obtain hydrophobized silica particles.

(Emulsion Composition M)

The emulsion composition M was obtained in the same manner as the emulsion composition K, except that silica particles (SANSIL SS-07; manufactured by Tokuyama Corporation; average particle size: 0.7 μm) were used as the solid particles.

(Emulsion Composition N)

The emulsion composition N was obtained in the same manner as the emulsion composition K, except that silica particles (Aerosil OX50; Nippon Aerosil Co., Ltd.; average primary particle size: about 0.04 μm) were used as the solid particles.

(Emulsion Composition O)

Hydrophobic silica particles (SANSIL SSP-03M; manufactured by Tokuyama Corporation; average particle size: 0.3 μm) were used as the solid particles. The hydrophobic silica particles failed to be dispersed in water due to the high hydrophobicity, and the hydrophobic silica particles were consequently dispersed in an oil phase. In a container, 5.2 parts by weight of the hydrophobic silica particles and 11.2 parts by weight of Sukore 64G (manufactured by Nisshin OilliO Group, Ltd.) as an oil phase component were placed, and the resulting mixture was processed using a homogenizer (IKA T25 digital ULTRA TURRAX) at 17,000 rpm for 2 minutes to obtain an oil phase. In a container, 6.6 parts by weight of the oil phase and 8.4 parts by weight of water as an aqueous phase component were placed, and the resulting mixture was agitated using a homogenizer at 17,000 rpm for 2 minutes to obtain the emulsion composition O.

(Emulsion Composition P)

The emulsion composition P was obtained in the same manner as the emulsion composition K, except that particles of starch (from corn; Wako Pure Chemical Industries, Ltd.; guaranteed reagent) were used as the solid particles.

(Emulsion Composition Q)

Silica particles (SANSIL SS-03; manufactured by Tokuyama Corporation; average particle size: 0.3 μm) were used as the solid particles. In a container, 2.5 parts by weight of the silica particles and 12.5 parts by weight of water as an aqueous phase component were placed, and the resulting mixture was processed using a homogenizer (IKA T25 digital ULTRA TURRAX) at 17,000 rpm for 2 minutes to obtain an aqueous phase. Sukore 64G (manufactured by Nisshin OilliO Group, Ltd.) was used as a sole oil phase component in an oil phase. In a container, 2.4 parts by weight of the aqueous phase and 12.6 parts by weight of the oil phase component were placed so that the content of the oil phase component was 70% by weight, and the resulting mixture was agitated using a homogenizer at 17,000 rpm for 2 minutes to obtain the emulsion composition Q. The emulsion composition Q was found to be thixotropic.

(Emulsion Composition R)

Particles of α-cyclodextrin (manufactured by CycloChem Co., Ltd.) were used as the solid particles. Water and α-cyclodextrin were combined to obtain an aqueous phase, in such a manner that the content of α-cyclodextrin in water was 4% by weight. Sukore 64G (manufactured by Nisshin OilliO Group, Ltd.) was used as a sole oil phase component in an oil phase. The composition R was prepared using a homomixer manufactured by PRIMIX Corporation (T.K. ROBOMIX). Into 10.5 parts by weight of the aqueous phase heated at 60° C. with agitation at 8,000 rpm, 4.5 parts by weight of the oil phase preheated at 60° C. were introduced (the oil phase component: 30% by weight). Furthermore, the resulting mixture was agitated at 10,000 rpm for 10 minutes to obtain the emulsion composition R.

(Emulsion Composition S)

Particles of α-cyclodextrin (manufactured by CycloChem Co., Ltd.) were used as the solid particles. Water and α-cyclodextrin were combined to obtain an aqueous phase, in such a manner that the content of α-cyclodextrin in the aqueous phase was 4% by weight. The aqueous phase was prepared using a buffer at pH 7 that contained phosphate-buffering substances at a concentration of 5 mM (including water as an aqueous phase component). Hydrogenated palm oil was used as a sole oil phase component in an oil phase. In a container, 10.5 parts by weight of the aqueous phase and 4.5 parts by weight of the oil phase component were placed so that the content of the oil phase component was 30% by weight, and the resulting mixture was agitated using a homogenizer (IKA T25 digital ULTRA TURRAX) at 10,000 rpm for 10 minutes to obtain the emulsion composition S.

(Emulsion Composition S')

The oil-in-water emulsion composition S' having the same composition as the composition S was prepared using a homomixer manufactured by PRIMIX Corporation (T.K. ROBOMIX), except that phosphate-buffering substances at a concentration of 5 mM were not contained. Into the aqueous phase heated at 60° C. with agitation at 8,000 rpm, the oil phase preheated at 60° C. was introduced. Furthermore, the resulting mixture was agitated at 10,000 rpm for 10 minutes to obtain the emulsion composition S'.

(Emulsion Composition T)

A composition containing 1.33% by weight of S-770 sucrose fatty acid ester (manufactured by Mitsubishi-Chemical Foods Corporation), 0.133% by mass of S-370 sucrose fatty acid ester (manufactured by Mitsubishi-Chemical Foods Corporation), and 0.133% by mass of a succinic acid monoglyceride, and 30% by weight of hydrogenated coconuts oil as an oil phase component was prepared as the emulsion composition T.

(Emulsion Composition U)

Particles of β-cyclodextrin (manufactured by CycloChem Co., Ltd.) were used as the solid particles. Water and β-cyclodextrin were combined to obtain an aqueous phase, in such a manner that the content of β-cyclodextrin in the aqueous phase was 4.67% by weight. The aqueous phase was prepared using a buffer at pH 7 that contained phosphate-buffering substances at a concentration of 5 mM (including water as an aqueous phase component). Hydrogenated coconuts oil was used as a sole oil phase component in an oil phase. In a container, 10.5 parts by weight of the aqueous phase and 4.5 parts by weight of the oil phase component were placed so that the content of the oil phase component in the whole composition was 30% by weight, and the resulting mixture was heated to 60° C. and agitated using a homogenizer (IKA T25 digital ULTRA TURRAX) at 10,000 rpm for 10 minutes to obtain the emulsion composition U.

(Emulsion Composition W)

Particles of α-cyclodextrin (manufactured by CycloChem Co., Ltd.) were used as the solid particles. An oil phase containing α-cyclodextrin at a concentration of 8.54% by weight was prepared using hydrogenated coconuts oil as an oil phase component. The aqueous phase was prepared using a buffer at pH 7 that contained phosphate-buffering substances at a concentration of 5 mM (including water as an aqueous phase component). The hydrogenated palm oil was heated to 60° C. before being weighed. In a container, water and the oil phase were placed in such a manner that the concentration of the hydrogenated palm oil in the whole composition was 30% by weight, and the resulting mixture was heated to 60° C. and agitated using a homogenizer (IKA T25 digital ULTRA TURRAX) at 17,000 rpm for 40 seconds to obtain the emulsion composition W.

TABLE 7

| | Emulsion composition K (Example B1) | Emulsion composition L (Example B2) | Emulsion composition M (Example B3) | Emulsion composition N (Example B4) | Emulsion composition O (Comparative Example B1) | Emulsion composition P (Comparative Example B2) | Emulsion composition Q (Example B5) | Emulsion composition R (Example B6) | Emulsion compositions S and S' (Examples B7 and B8) | Emulsion composition U (Example B9) |
|---|---|---|---|---|---|---|---|---|---|---|
| Solid particles | Silica particles SS-03 | Hydrophobized silica particles | Silica particles SS-07 | Hydrophobic silica particles OX50 | Silica particles SSP-03M | Starch (from corn) | Silica particles SS-03 | α-Cyclodextrin | α-Cyclodextrin | β-Cyclodextrin |
| Average particle size or primary particle size of solid particles (μm) | 0.3 (average particle size) | — | 0.7 (average particle size) | 0.04 (primary particle size) | 0.3 (average particle size) | — | 0.3 (average particle size) | — | — | — |
| Specific surface area of solid particles (m²/g) | 11 | — | 4 | 50 ± 15 | 8 | — | 11 | — | — | — |
| Average particle size of solid particles in water (μm) | 0.306 | 9.304 | 0.726 | 0.224 | — | — | 0.306 | 0.627 | 0.627 | 0.378 |
| Median diameter of solid particles in water (μm) | 0.301 | 0.453 | 0.689 | 0.209 | — | — | 0.301 | 0.846 | 0.846 | 0.412 |
| L value of solid particles | — | — | 98 | — | — | — | — | 99 | 99 | 97 |
| Contact angle of an aqueous phase component to solid particles (degrees) | 0 | 69 | 0 | 0 | 135 | 0 | 0 | 22.6 | 16.6 | 26.2 |
| Contact angle of an oil phase component to solid particles (degrees) | 8.7 | 12 | 21.16 | 17.2 | 16 | 7.9 | 8.7 | 16.7 | 30.5 | 20.2 |
| Success in formation of an oil-in-water emulsion composition | ○ | ○ | ○ | ○ | × | ○ | ○ | ○ | ○ | ○ |

Note 1:
the contact angle of an aqueous phase component was determined to be a contact angle of 0 degrees when a drop was absorbed by a tablet within 3.5 seconds from the touch of the drop with the tablet; in the emulsion composition P, deformation of the tablet was observed at the area where the aqueous phase component was dropped, after the aqueous phase component was absorbed by the tablet.

Note 2:
the average particle size or primary particle size and specific surface area of solid particles of each type were catalog values or manufacturer-measured valued.

<Evaluation of Heat Resistance of Oil-in-Water Emulsion Compositions>

Evaluation Example 1

One ml of each of the oil-in-water emulsion compositions K, L, M, and N, respectively, according to Examples B1, B2, B3, and B4 was transferred to microtubes, and the caps of the microtubes were opened and the resulting openings of the microtubes were covered with aluminium foil, after which each of the microtubes was heated at 121° C. for 30 minutes in a BS-325 autoclave manufactured by Tomy Seiko Co., Ltd. The emulsion compositions K, L, M, and N before and after heating at 121° C. were observed by microscopy using an ECLIPSE LV 100N POL polarization microscope manufactured by Nikon Corporation and the NIS-Elements ver.3.2 imaging software manufactured by Nikon Corporation. The diameters of not less than 20 oil droplets were measured on each of the observation images, and the results of calculation of mean diameter and standard deviation are shown in Table 8.

As seen in Table 8, no change in the average particle size of oil droplets before and after heating at 121° C. was detected. This indicated that preparation of an emulsion using solid particles with desired wettability would not promote coalescence of oil droplets even during heat sterilization but provide enough heat resistance to withstand pressurization at high temperature.

TABLE 8

|  | Emulsion composition K (Example B1) | Emulsion composition L (Example B2) | Emulsion composition M (Example B3) | Emulsion composition N (Example B4) |
| --- | --- | --- | --- | --- |
| The average diameter and standard deviation of oil droplets before heating | 14.92 ± 3.95 (μm) | 44.61 ± 16.81 (μm) | 34.87 ± 5.12 (μm) | 9.06 ± 4.94 (μm) |
| The average diameter and standard deviation of oil droplets after heating | 12.38 ± 5.28 (μm) | 47.39 ± 16.61 (μm) | 42.03 ± 4.76 (μm) | 9.66 ± 4.96 (μm) |
| Change in average diameter before and after heating | −17 (%) | +6.2 (%) | +20 (%) | +6.6 (%) |

Figure 8:
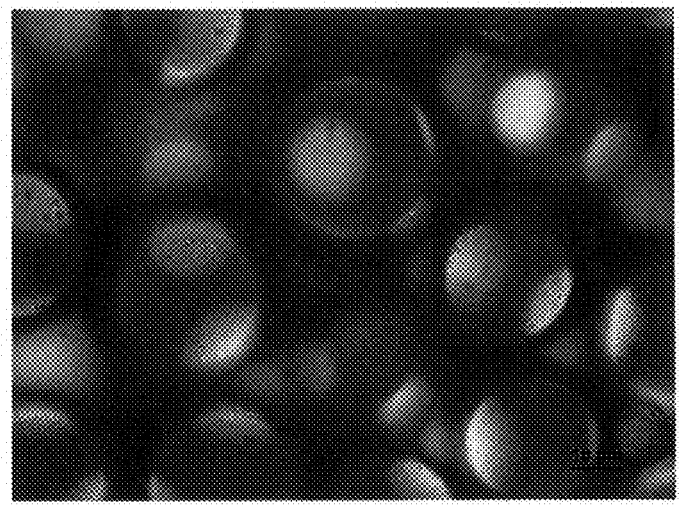
FIG. 8 shows a micrograph (a picture as a substitute for a diagram) of the emulsion composition C prepared in Examples, taken before the emulsion composition is heated.

The result from microscopic observation of the emulsion composition M before heating is shown in FIG. 8. The presence of silica particles on the surfaces of emulsion droplets was able to be detected. Thus, the oil-in-water emulsion composition was indicated to have a structure where the particles were distributed along the interface between the aqueous and oil phases. The diameter was measured for 50 solid particles adsorbed to the interface between the aqueous and oil phases, and the average diameter and the standard deviation were found to be 0.69 μm and 0.07, respectively.

Figure 9:
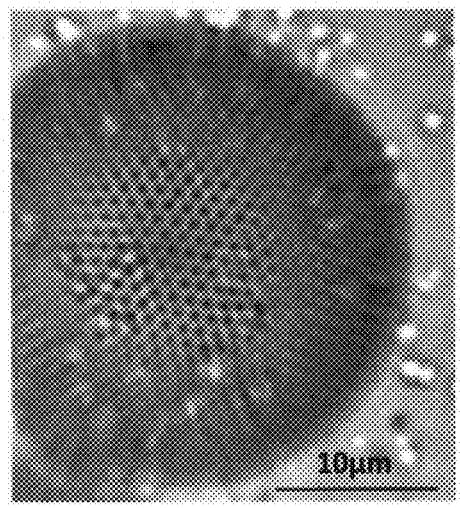
FIG. 9 shows a micrograph (a picture as a substitute for a diagram) of the emulsion composition C prepared in Examples, taken after the emulsion composition is heated at 121° C. for 30 minutes.

The result from microscopic observation of the emulsion composition M after heating at 121° C. for 30 minutes is shown in FIG. 9. When the emulsion composition after heating was diluted with water and then observed by microscopy, the presence of silica particles on the surfaces of emulsion droplets (the interface between the aqueous and oil phases) was able to be detected, which indicated the heat resistance and dilution stability of the composition. The diameter was measured for 30 solid particles adsorbed to the interface between the aqueous and oil phases, and the average diameter and the standard deviation were found to be 0.74 μm and 0.14, respectively.

Additionally, no floating of oil droplets (creaming) was observed in the emulsion compositions K, L, M, and N before and after heating. This indicated that the solid particles act on the water/oil interface of each emulsion composition and exert an effect of modifying the apparent specific gravity of an oil droplet, by which an effect to inhibit creaming of an emulsion, which leads to the instability of the emulsion due to an increased probability of oil droplets approaching or colliding with each other, is also exerted to each emulsion composition.

Therefore, it was indicated that the preparation of an oil-in-water emulsion composition by using silica particles with the defined wettability caused the oil-in-water emulsion composition to have a structure where the solid particles were distributed along the interface between the aqueous and oil phases, regardless of whether or not the emulsion composition was heated and diluted.

Evaluation Example 2

When the emulsion composition P according to Comparative Example B2 was maintained at room temperature, oil phase separation was detected at 5 minutes later, which indicated poor emulsion stability of the compound. Based on the observation that the emulsion composition P according to Comparative Example B2, which had been prepared using solid particles forming a contact angle of 90.0 degrees or less with the aqueous phase component and a contact angle of less than 8.0 degrees with the oil phase component, showed oil phase separation occurring soon after the start of storage at room temperature, it is easily understood that oil phase separation in the emulsion composition is promoted due to activated mobility of oil droplets in cases where the emulsion composition experiences a high temperature sterilization process.

Evaluation Example 3

The oil-in-water emulsions R, S, S', and U according to Examples B6, B7, B8, and B9 were heated under desired conditions and the presence or absence of oil phase separation was identified by visually observing each of the oil-in-water emulsions in a container in the transverse direction. The results are shown in Table 9. In the table, the absence of oil phase separation is indicated by a circle and the presence of oil phase separation is indicated by an x-mark.

TABLE 9

| Heating conditions | Emulsion composition R (Example B6) | Emulsion composition S (Example B7) | Emulsion composition S' (Example B8) | Emulsion composition U (Example B9) |
|---|---|---|---|---|
| 65° C. for 30 minutes | ○ | ○ | ○ | ○ |
| 75° C. for 15 seconds | — | ○ | — | ○ |

Evaluation Example 4

The oil-in-water emulsion compositions S, S', and U according to Examples B7, B8, and B9, and the emulsion composition W (Example B10), all of which had been emulsified at 60° C., were placed in a water bath to cool the emulsion compositions to room temperature. Subsequently, the containers were shaken by inversion to identify the presence or absence of fluidity in the oil-in-water emulsion compositions S, S', U and W by visual observation. The containers were further cooled in a refrigerator at 4° C. and then shaken by inversion to identify the presence or absence of fluidity in the oil-in-water emulsion compositions S, S', U and W by visual observation. The results are shown in Table 10, in which the presence of fluidity is indicated by a circle and the absence of fluidity is indicated by an x-mark.

TABLE 10

| | | Emulsion composition S (Example B7) | Emulsion composition S' (Example B8) | Emulsion composition U (Example B9) | Emulsion composition W (Example B10) |
|---|---|---|---|---|---|
| Temperature of an emulsion | 60° C. | ○ | ○ | ○ | ○ |
| | Room temperature | ○ | ○ | ○ | ○ |
| | 4° C. | — | ○ | — | — |

Evaluation Example 5

Particle size distribution measurement was performed on the emulsion compositions R, S', U, and W according to Examples B6, B8, B9, and B10, and the emulsion composition T (Comparative Example B3), all of which had been cooled down to room temperature, by a flow method using an LA-920 laser diffraction/scattering particle size analyzer manufactured by Horiba, Ltd. A relative refractive index of 1.20 was used for the measurement, and the measurement results obtained by conversion from volume measurements are shown in Table 11. The emulsion compositions R and S' were sterilized at 65° C. for 30 minutes and then cooled down to room temperature.

Even in cases where a mixture having the same composition as the emulsion composition R was agitated with a homogenizer (at 17,000 rpm for 2 minute) at room temperature, formation of an oil-in-water emulsion was observed in the mixture, and the average particle size and median diameter of oil droplets in the oil-in-water emulsion were found to be 92.4 μm and 76.5 μm, respectively. The measurement was performed by the same method as that indicated in Table 11.

Additionally, the emulsion compositions R, S', and T, all of which contained the same amount of an oil phase component, were cooled down to room temperature and then stored in a refrigerator until analysis, and subsequently ingested at room temperature by a panel of five researchers who were engaged in the research and development. Each of the researches compared those three emulsion compositions in terms of the strength of oily impression, while being kept unaware (blind) of the components of the emulsion compositions. The results were later discussed by the five researchers and the results granted by the researches are presented in Table 11. The emulsion compositions R and S' were sterilized at 65° C. for 30 minutes and then cooled down to room temperature.

TABLE 11

| | Emulsion composition R (Example B6) | Emulsion composition S' (Example B8) | Emulsion composition U (Example B9) | Emulsion composition W (Comparative Example B10) | Emulsion composition T (Comparative Example B3) |
|---|---|---|---|---|---|
| Average particle size of emulsion droplets (μm) | 77.4 | 14.9 | 94.8 | 41.4 | 0.352 |

TABLE 11-continued

|  | Emulsion composition R (Example B6) | Emulsion composition S' (Example B8) | Emulsion composition U (Example B9) | Emulsion composition W (Comparative Example B10) | Emulsion composition T (Comparative Example B3) |
|---|---|---|---|---|---|
| Median diameter of emulsion droplets (μm) | 71.4 | 12.9 | 70.6 | 37.9 | 0.349 |
| Oily impression (taste) | A stronger oily impression than that of Comparative Example B3 | A stronger oily impression than that of Comparative Example B3 | — | — | A weaker oily impression than that of Comparative Examples B6 and B8 |

Figure 10:
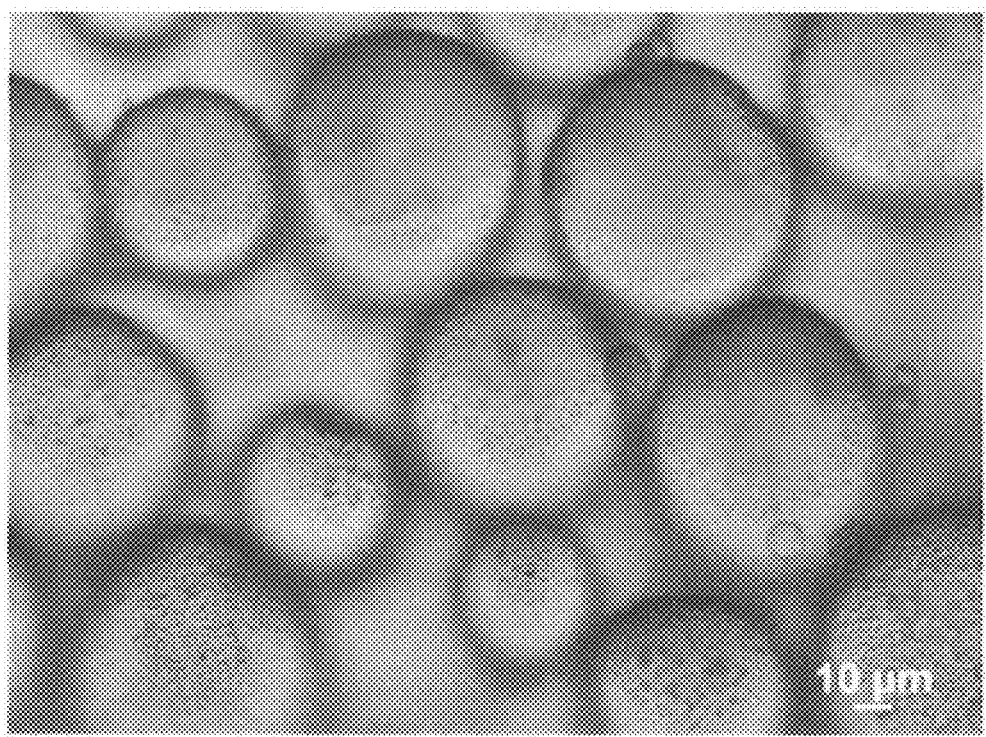
FIG. 10 shows a polarization micrograph (a picture as a substitute for a diagram) of the emulsion composition R prepared in Examples.

Additionally, the emulsion composition R according to Example B6 was observed by microscopy using an ECLIPSE LV 100N POL polarization microscope manufactured by Nikon Corporation and the NIS-Elements ver.3.2 imaging software manufactured by Nikon Corporation. The result is shown in FIG. 10. As seen FIG. 10, the presence of solid particles along the oil/water interface was identified.

Evaluation Example 6

The emulsion compositions S' and T according to Example B8 and Comparative Example B3 were stored in a refrigerator (at 4° C.) for about 7.5 months. Fluidity was maintained in the emulsion composition S' even after the storage. Additionally, the median diameter and average particle size of the emulsion composition S' were measured in the same manner as described in the section "Evaluation Example 5" and found to be 14.07 μm and 15.71 μm, respectively. On the other hand, fluidity was lost in the composition T after the storage at 4° C. for about 7.5 months.

The oil-in-water emulsion composition prepared using solid particles with the defined wettability was indicated to have excellent storage stability.

Although the present invention has been described with reference to specific embodiments, each embodiment was presented as an example and does not limit the scope of the present invention. Each of the embodiments described herein can be variously modified without departing from the spirit of the invention, and can be combined with characteristics described by other embodiments so long as it can be enabled.

What is claimed is:

1. An oil-in-water emulsion composition, comprising:
   solid particles,
   a surfactant containing one alkyl group,
   an oil phase component, and
   an aqueous phase component,
   wherein the oil phase component comprises an edible oil or fat having at least one unsaturated bond and/or at least one oxygen atom;
   the solid particles are distributed along an interface between the oil phase component and the aqueous phase component; and
   the surfactant is in a concentration of 0.00001% by weight to 0.05% by weight relative to the total weight of the composition.

2. The oil-in-water emulsion composition according to claim 1, which is resistant to heat at a temperature of 60° C. or higher.

3. The oil-in-water emulsion composition according to claim 1, wherein the surfactant has a molecular weight of 5,000 or less and does not include a polysaccharide and a synthetic polymer.

4. The oil-in-water emulsion composition according to claim 1, wherein the surfactant comprises a surfactant having an HLB value of greater than 8.

5. The oil-in-water emulsion composition according to claim 1, wherein a concentration of the surfactant in the oil-in-water emulsion composition is not higher than a critical micelle concentration of the surfactant.

6. The oil-in-water emulsion composition according to claim 1, wherein the surfactant comprises a surfactant that contains at least one cationic group.

7. The oil-in-water emulsion composition according to claim 1, wherein the surfactant comprises a cationic surfactant.

8. The oil-in-water emulsion composition according to claim 1, wherein an average particle size of the solid particles is not less than 0.01 μm and not more than 5 μm.

9. The oil-in-water emulsion composition according to claim 1, wherein an average particle size of the solid particles distributed along an interface between a continuous phase and a discontinuous phase is not less than 0.01 μm and not more than 5 μm.

10. The oil-in-water emulsion composition according to claim 1, wherein a size of discontinuous phase droplets in the oil-in-water emulsion composition is not less than 0.5 μm and less than 1 mm.

11. A food, comprising the oil-in-water emulsion composition according to claim 1.

12. A method of producing the oil-in-water emulsion composition according to claim 1, comprising:
   first mixing the aqueous phase component with the surfactant and the solid particles and agitating a first mixture produced by the first mixing, and
   second mixing the first mixture with the oil phase component, and agitating a second mixture produced by the second mixing.

13. A method of producing the oil-in-water emulsion composition according to claim 1, comprising:
   first mixing the oil phase component with the surfactant and the solid particles and agitating a first mixture produced by the first mixing, and
   second mixing the first mixture with the aqueous phase component and agitating a second mixture produced by the second mixing.

14. A food, comprising:
an oil-in-water emulsion composition comprising solid particles, a surfactant, an oil phase component, and an aqueous phase component,
wherein the oil phase component comprises an edible oil or fat;
the solid particles are distributed along an interface between the oil phase component and the aqueous phase component; and
the surfactant is in a concentration of 0.00001% by weight to 0.05% by weight relative to the total weight of the composition.

15. The food according to claim 14, wherein the oil-in-water emulsion composition is resistant to heat at a temperature of 60° C. or higher.

16. The food according to claim 14, wherein the surfactant comprises a surfactant having an HLB value of greater than 8.

17. The food according to claim 14, wherein a concentration of the surfactant in the oil-in-water emulsion composition is not higher than a critical micelle concentration of the surfactant.

18. The food according to claim 14, wherein the surfactant comprises a surfactant that contains at least one cationic group.

19. The food according to claim 14, wherein the surfactant comprises a cationic surfactant.

20. The food according to claim 14, wherein an average particle size of the solid particles is not less than 0.01 μm and not more than 5 μm.

21. The food according to claim 14, wherein an average particle size of the solid particles distributed along an interface between a continuous phase and a discontinuous phase is not less than 0.01 μm and not more than 5 μm.

22. The food according to claim 14, wherein a size of discontinuous phase droplets in the oil-in-water emulsion composition is not less than 0.5 μm and less than 1 mm.

23. A method of producing the food according to claim 14, comprising:
first mixing the aqueous phase component with the surfactant and the solid particles and agitating a first mixture produced by the first mixing, and
second mixing the first mixture obtained in the prior step with the oil phase component and agitating a second mixture produced by the second mixing.

24. A method of producing the food according to claim 14, comprising:
first mixing the oil phase component with the surfactant and the solid particles and agitating a first mixture produced by the first mixing, and
second mixing the first mixture obtained in the prior step with the aqueous phase component and agitating a second mixture produced by the second mixing.

25. A pharmaceutical product, comprising the oil-in-water emulsion composition according to claim 1.

26. A cosmetic, comprising the oil-in-water emulsion composition according to claim 1.

* * * * *

UNITED STATES PATENT AND TRADEMARK OFFICE
CERTIFICATE OF CORRECTION

PATENT NO. : 11,582,981 B2  
APPLICATION NO. : 16/434474  
DATED : February 21, 2023  
INVENTOR(S) : Minako Hanasaki et al.

Page 1 of 2

It is certified that error appears in the above-identified patent and that said Letters Patent is hereby corrected as shown below:

In the Specification  
Columns 41-44, Table 1:

Table 1

"
| | Oil-in-Water emulsion compositions A and G | Oil-in-Water emulsion composition B | Oil-in-Water emulsion compositions C and H | Oil-in-Water emulsion composition D | Oil-in-Water emulsion compositions E and I | Composition F |
|---|---|---|---|---|---|---|
| Solid particles | Silica particles SS-07 | Hydrophilic silica particles OX50 | Silica particles SS-07 | Hydrophilic silica particles OX50 | - | Silica particles SS-07 |
| Surfactant | CTAB | CTAB | - | - | CTAB | CTAB |
| HLB of the surfactant | 10 | 10 | - | - | 10 | 10 |
| Critical micelle concentration of the surfactant (mol/L) | $9 \times 10^{-4}$ | $9 \times 10^{-4}$ | - | - | $9 \times 10^{-4}$ | $9 \times 10^{-4}$ |
| Concentration (% by weight) of the surfactant in each oil-in-water emulsion composition | 0.0039 | 0.0054 | - | - | 0.0057 | 0.030 |
| Content (parts by weight) of the surfactant relative to 100 parts by weight of the solid particles | 0.028 (0.076 meq) | 0.16 (0.45 meq) | - | - | - | 0.21 (0.58 meq) |
| Average particle size or primary particle size of the solid particles (μm) * catalog value | 0.7 | 0.04 | 0.7 | 0.04 | - | 0.7 |
| Specific surface area of the solid particles (m²/g) * catalog value | 4 | 50 ± 15 | 4 | 50 ± 15 | - | 4 |
| Average particle size of the solid particles in water (μm) | 0.726 | 0.224 | 0.726 | 0.224 | - | 0.726 |
"

Signed and Sealed this  
Fifth Day of September, 2023

Katherine Kelly Vidal  
*Director of the United States Patent and Trademark Office*

CERTIFICATE OF CORRECTION (continued)
U.S. Pat. No. 11,582,981 B2

Should read:

Table 1

|  | Oil-in-Water emulsion compositions A and G | Oil-in-Water emulsion composition B | Oil-in-Water emulsion compositions C and H | Oil-in-Water emulsion composition D | Oil-in-Water emulsion compositions E and I | Composition F |
|---|---|---|---|---|---|---|
| Solid particles | Silica particles SS-07 | Hydrophilic silica particles OX50 | Silica particles SS-07 | Hydrophilic silica particles OX50 | - | Silica particles SS-07 |
| Surfactant | CTAB | CTAB | - | - | CTAB | CTAB |
| HLB of the surfactant | 10 | 10 | - | - | 10 | 10 |
| Critical micelle concentration of the surfactant (mol/L) | $9 \times 10^{-4}$ | $9 \times 10^{-4}$ | - | - | $9 \times 10^{-4}$ | $9 \times 10^{-4}$ |
| Concentration (% by weight) of the surfactant in each oil-in-water emulsion composition | 0.0039 | 0.0054 | - | - | 0.0057 | 0.030 |
| Content (parts by weight) of the surfactant relative to 100 parts by weight of the solid particles | 0.028 (0.076 meq) | 0.16 (0.45 meq) | - | - | - | 0.21 (0.58 meq) |
| Average particle size or primary particle size of the solid particles (μm) * catalog value | 0.7 | 0.04 | 0.7 | 0.04 | - | 0.7 |
| Specific surface area of the solid particles (m²/g) * catalog value | 4 | 50 ± 15 | 4 | 50 ± 15 | - | 4 |
| Average particle size of the solid particles in water (μm) | 0.726 | 0.224 | 0.726 | 0.224 | - | 0.726 |